US012732845B2

(12) United States Patent
Manolakos et al.

(10) Patent No.: US 12,732,845 B2
(45) Date of Patent: Sep. 8, 2026

(54) PROCESSING TIMELINE CONSIDERATIONS FOR CHANNEL STATE INFORMATION

(71) Applicant: QUALCOMM Incorporated, San Diego, CA (US)

(72) Inventors: Alexandros Manolakos, Escondido, CA (US); Pavan Kumar Vitthaladevuni, San Diego, CA (US); Taesang Yoo, San Diego, CA (US); June Namgoong, San Diego, CA (US); Jay Kumar Sundararajan, San Diego, CA (US); Naga Bhushan, San Diego, CA (US); Krishna Kiran Mukkavilli, San Diego, CA (US); Tingfang Ji, San Diego, CA (US); Hwan Joon Kwon, San Diego, CA (US); Wanshi Chen, San Diego, CA (US)

(73) Assignee: QUALCOMM Incorportated, San Diego, CA (US)

( * ) Notice: Subject to any disclaimer, the term of this patent is extended or adjusted under 35 U.S.C. 154(b) by 661 days.

(21) Appl. No.: 18/015,683

(22) PCT Filed: Aug. 13, 2021

(86) PCT No.: PCT/US2021/046037
§ 371 (c)(1),
(2) Date: Jan. 11, 2023

(87) PCT Pub. No.: WO2022/040055
PCT Pub. Date: Feb. 24, 2022

(65) Prior Publication Data

US 2023/0319617 A1 Oct. 5, 2023

(30) Foreign Application Priority Data

Aug. 18, 2020 (GR) ............................. 20200100496

(51) Int. Cl.
*H04W 24/10* (2009.01)
*G06N 3/08* (2023.01)

(52) U.S. Cl.
CPC ............. *H04W 24/10* (2013.01); *G06N 3/08* (2013.01)

(58) Field of Classification Search
CPC ..... H04W 24/10; H04W 24/02; H04W 52/16; H04W 52/325; H04W 72/54;
(Continued)

(56) References Cited

U.S. PATENT DOCUMENTS 6,269,351 B1 * 7/2001 Black ...................... G06F 16/30 706/14
10,310,079 B1 * 6/2019 Um ........................ G01S 15/04
(Continued)

FOREIGN PATENT DOCUMENTS

CN 109450830 A 3/2019
CN 110035427 A 7/2019
(Continued)

OTHER PUBLICATIONS

Zheng et al. (TiFL: a Tier-based Federated Learning System)—Jun. 2020 (Year: 2020).*
(Continued)

*Primary Examiner* — Quan M Hua
(74) *Attorney, Agent, or Firm* — Procopio, Cory, Hargreaves & Savitch LLP

(57) ABSTRACT

A first wireless device, such as a user equipment, generates a message indicating a processing time for at least one of training a neural network for channel state information (CSI) derivation or for reporting the CSI based on a trained neural network. The first wireless device transmits the message indicating the processing time to a second wireless device.
(Continued)

The second wireless device may be a network entity, such as a base station, a transmission reception point, or another UE.

28 Claims, 17 Drawing Sheets

(58) Field of Classification Search
CPC ..... H04W 72/23; H04W 48/14; H04W 48/16; H04W 72/04; H04W 72/1263; H04W 72/542; H04W 24/08; H04W 28/06; H04W 4/70; H04W 56/00; H04W 72/046; H04W 72/1273; H04W 72/541; H04W 74/002; H04W 74/0833; H04W 76/19; H04W 76/36; H04W 76/38; H04W 84/12
See application file for complete search history.

(56) References Cited

U.S. PATENT DOCUMENTS

2003/0182250 A1 9/2003 Shihidehpour et al.
2018/0367192 A1 12/2018 O'Shea et al.
2019/0020530 A1* 1/2019 Au ........................ H04W 72/21
2020/0177254 A1 6/2020 Lee et al.
2020/0327448 A1* 10/2020 Yakovlev ............... G06N 3/048
2021/0075486 A1 3/2021 Song et al.
2021/0091838 A1* 3/2021 Bai ...................... H04B 7/0639
2021/0351885 A1* 11/2021 Chavva .................... G06N 3/08

FOREIGN PATENT DOCUMENTS

CN 111342867 A 6/2020
WO 2019137226 A1 7/2019

OTHER PUBLICATIONS

Jung et al. (Restructuring Batch normalization to Accelerate CNN training) (Year: 2019).*
International Search Report and Written Opinion—PCT/US2021/046037—ISA/EPO—Dec. 9, 2021.

* cited by examiner

100
IP Services
176
IP Services
197
EPC
160
Other MMEs
164
MME
162
MBMS GW
168
Serving Gateway
166
BM-SC
170
PDN Gateway
172
HSS
174
Core Network
190
Other AMFs
193
AMF
192
SMF
194
UPF
195
UDM
196
Neural Network Configuration Component
199
Neural Network Capability/Configuration Component
198
TRP
103
UE
104
Base Station
102/180
109
111
120
132
134
158
184
182'
182
182''
110
110 (110')
102
102 (102')
150
152
154

PROCESSING TIMELINE CONSIDERATIONS FOR CHANNEL STATE INFORMATION

CROSS REFERENCE TO RELATED APPLICATION(S)

This application is a National Stage Application filed under 35 U.S.C. § 371 of PCT International Application No. PCT/US2021/046037, entitled "Processing Timeline Considerations for Channel State Information" and filed Aug. 13, 2021, which claims the benefit of and priority to Greek patent application No. 20200100496, entitled "Processing Timeline Considerations for Channel State Information" and filed on Aug. 18, 2020, which are expressly incorporated by reference herein in their entirety.

TECHNICAL FIELD

The present disclosure relates generally to communication systems, and more particularly, to encoding a data set using operations of a neural network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method for wireless communication is provided for wireless communication. The method includes generating a message indicating a processing time at a user equipment (UE) for at least one of training a neural network for channel state information derivation or reporting the CSI based on a trained neural network; and transmitting the message indicating the processing time to a first network entity.

In another aspect of the disclosure, an apparatus for wireless communication is provided. The apparatus includes means for generating a message indicating a processing time at the UE for at least one of training a neural network for channel state information derivation or reporting the CSI based on a trained neural network; and means for transmitting the message indicating the processing time to a first network entity.

In another aspect of the disclosure, an apparatus for wireless communication is provided. The apparatus includes memory and at least one processor coupled to the memory, the memory and at least one processor are configured to generate a message indicating a processing time at the UE for at least one of training a neural network for channel state information derivation or reporting the CSI based on a trained neural network; and transmit the message indicating the processing time to a first network entity.

In another aspect of the disclosure, a computer-readable medium storing computer executable code for wireless communication at a UE is provided, the code when executed by a processor cause the processor to generate a message indicating a processing time at the UE for at least one of training a neural network for channel state information derivation or reporting the CSI based on a trained neural network; and transmit the message indicating the processing time to a first network entity.

In another aspect of the disclosure, a method for wireless communication is provided.

The method includes receiving a processing time from a user equipment (UE) for at least one of training a neural network for channel state information derivation or reporting the CSI based on a trained neural network; transmitting a configuration to the UE based on the processing time; and receiving the CSI from the UE based on the configuration.

In another aspect of the disclosure, an apparatus for wireless communication is provided. The apparatus includes means for receiving a processing time from a UE for at least one of training a neural network for channel state information derivation or reporting the CSI based on a trained neural network; means for transmitting a configuration to the UE based on the processing time; and means for receiving the CSI from the UE based on the configuration.

In another aspect of the disclosure, an apparatus for wireless communication is provided. The apparatus includes memory and at least one processor coupled to the memory, the memory and at least one processor are configured to receive a processing time from a UE for at least one of training a neural network for channel state information derivation or reporting the CSI based on a trained neural network; transmit a configuration to the UE based on the processing time; and receive the CSI from the UE based on the configuration.

In another aspect of the disclosure, a computer-readable medium storing computer executable code for wireless communication at a UE is provided, the code when executed by a processor cause the processor to receive a processing time from a UE for at least one of training a neural network for channel state information derivation or reporting the CSI based on a trained neural network; transmit a configuration to the UE based on the processing time; and receive the CSI from the UE based on the configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
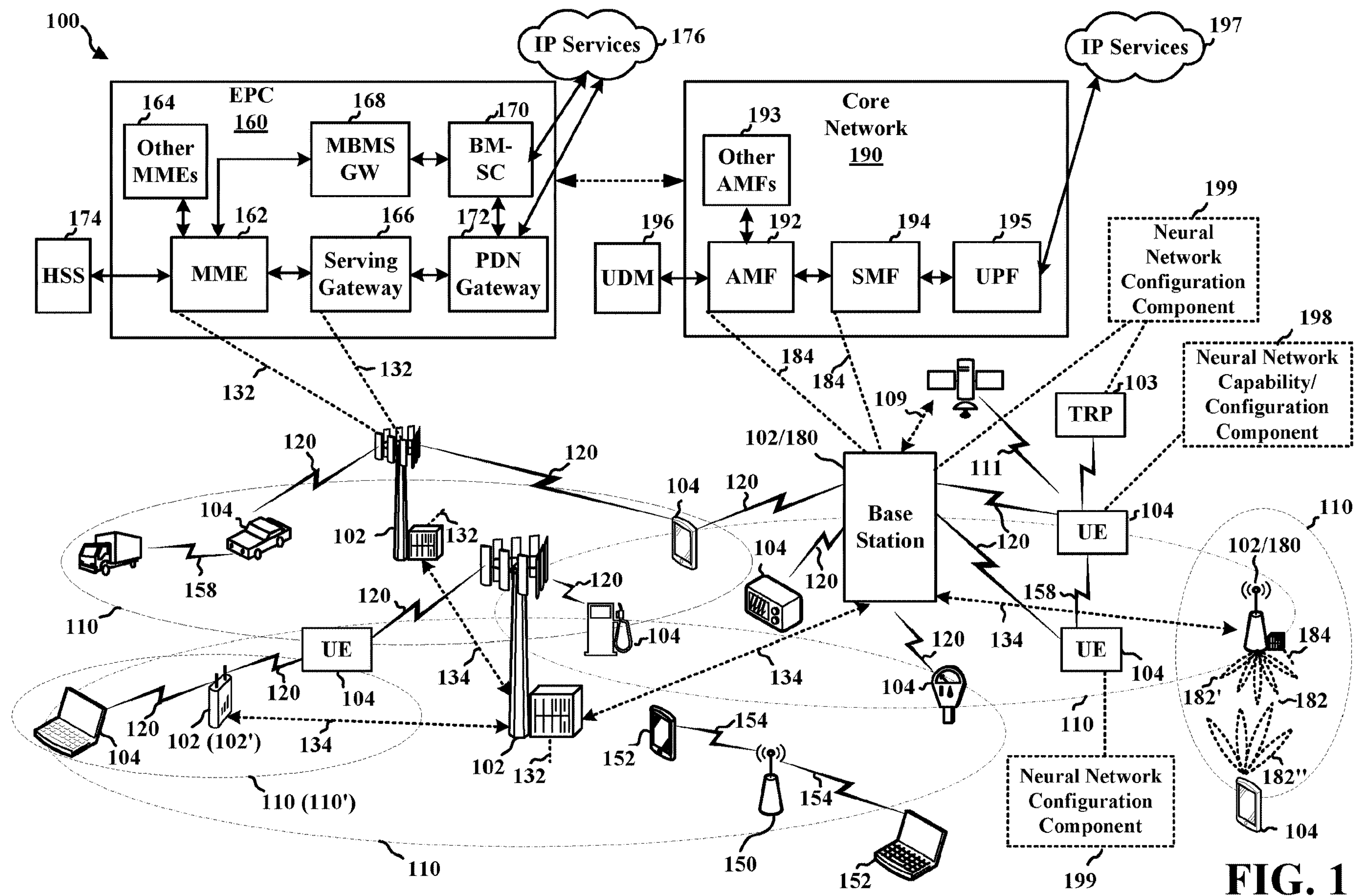
FIG. 1 is a diagram illustrating an example of a wireless communications system and an access network.

An encoding device operating in a network may measure reference signals and/or the like to report to a network entity. For example, the encoding device may measure reference signals during a beam management process for channel state feedback (CSF), may measure received power of reference signals from a serving cell and/or neighbor cells, may measure signal strength of inter-radio access technology (e.g., WiFi) networks, may measure sensor signals for detecting locations of one or more objects within an environment, and/or the like. However, reporting this information may consume communication and/or network resources.

In some aspects described herein, an encoding device (e.g., a UE, a base station, a transmit receive point (TRP), a network device, a low-earth orbit (LEO) satellite, a medium-earth orbit (MEO) satellite, a geostationary earth orbit (GEO) satellite, a high elliptical orbit (HEO) satellite, and/or the like) may train one or more neural networks to learn dependence of measured qualities on individual parameters, isolate the measured qualities through various layers of the one or more neural networks (also referred to as “operations”), and compress measurements in a way that limits compression loss. In some aspects, the encoding device may use a nature of a quantity of bits being compressed to construct a process of extraction and compression of each feature (also referred to as a dimension) that affects the quantity of bits. In some aspects, the quantity of bits may be associated with sampling of one or more reference signals and/or may indicate channel state information. For example, the encoding device may encode measurements, to produce compressed measurements, using one or more extraction operations and compression operations associated with a neural network with the one or more extraction operations and compression operations being based at least in part on a set of features of the measurements.

The encoding device may transmit the compressed measurements to a network entity, such as server, a TRP, another UE, a base station, and/or the like. Although examples described herein refer to a base station as the decoding device, the decoding device may be any network entity. The network entity may be referred to herein as a “decoding device.”

The decoding device may decode the compressed measurements using one or more decompression operations and reconstruction operations associated with a neural network. The one or more decompression and reconstruction operations may be based at least in part on a set of features of the compressed data set to produce reconstructed measurements. The decoding device may use the reconstructed measurements as channel state information feedback.

In some aspects, a UE may determine a processing time for training a neural network and/or reporting CSI with a trained neural network and may provide the processing time to a network entity. The UE may then receive a configuration for training the neural network and/or for reporting CSI based on the processing time. For example, the UE may determine the processing time based on parameters of the neural network, such as a number of layers of the neural network, a number of weights of the neural network, a type of layers of the neural network, whether a previously trained neural network, whether multiple neural networks will be trained simultaneously, a procedure for which the neural network is to be trained, a requested accuracy, the number of layers to be trained within the layers of the neural network, a sequence of layers. The UE may determine a processing time after training based on any of an encoder output vector, an encoder input vector, a combination of vectors, a number of layers of the neural network, a number of elements in the input/output/intermediate vectors, a type of the layers in the neural network, or a sequence of layers.

The UE may report a training and/or processing capability per layer, per type of layer, per combination of layers, per length of input/output/intermediate vector, per number of layers, or per sequence of layers. The UE may report processing times for different levels, e.g., a slower time and a faster time, for the same neural network, same layer, same layer combination, or same sequence of layers. The UE may then receive a configuration to use one of the processing times.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described techniques. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components (e.g., associated with a user equipment (UE) and/or a base station), end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In some aspects, a UE 104 may be configured to access a radio cell supported by an non-terrestrial network (NTN) device 107, and the network 100 may be referred to as an NTN. The NTN device 107 may be referred to as a space-borne vehicle or an airborne vehicle. In some examples, the NTN device 107 may be configured to operate as a relay for communications between the UEs 104 and the base stations 102 or 180. In such examples, the NTN device 107 may be referred to as a transparent payload and the base stations 102 or 180 may be referred to as terrestrial base stations. In some examples, the NTN device 107 may include an on-board base station and/or a disaggregated base station. In such examples, the NTN device 107 may be referred to as a regenerative payload and/or as an NTN base station. A feeder link 109 may be provided between the NTN device 107 and a gateway device, and a service link 111 may be provided between the UE 104 and the NTN device 107.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a neural network capability/configuration component 198 that is configured to determine a processing time for at least one of training a neural network for CSI derivation or for reporting the CSI based on a trained neural network and providing the processing time to a network entity, such as a base station 102 or 180, a transmission reception point (TRP) 103, or another UE 104.

A network entity, such as a base station 102 or 180, a TRP 103, or a UE 104 may include a neural network configuration component 199 configured to receive a processing time from a UE for at least one of training a neural network for CSF or reporting the CSF based on a trained neural network; transmitting a configuration to the UE based on the processing time; and receiving CSI from the UE based on the configuration.

Although the following description may be focused on 5G NR, the concepts described herein may be applicable to other similar areas, such as LTE, LTE-A, CDMA, GSM, and other wireless technologies.

Figures 2A, 2B, 2C, 2D:
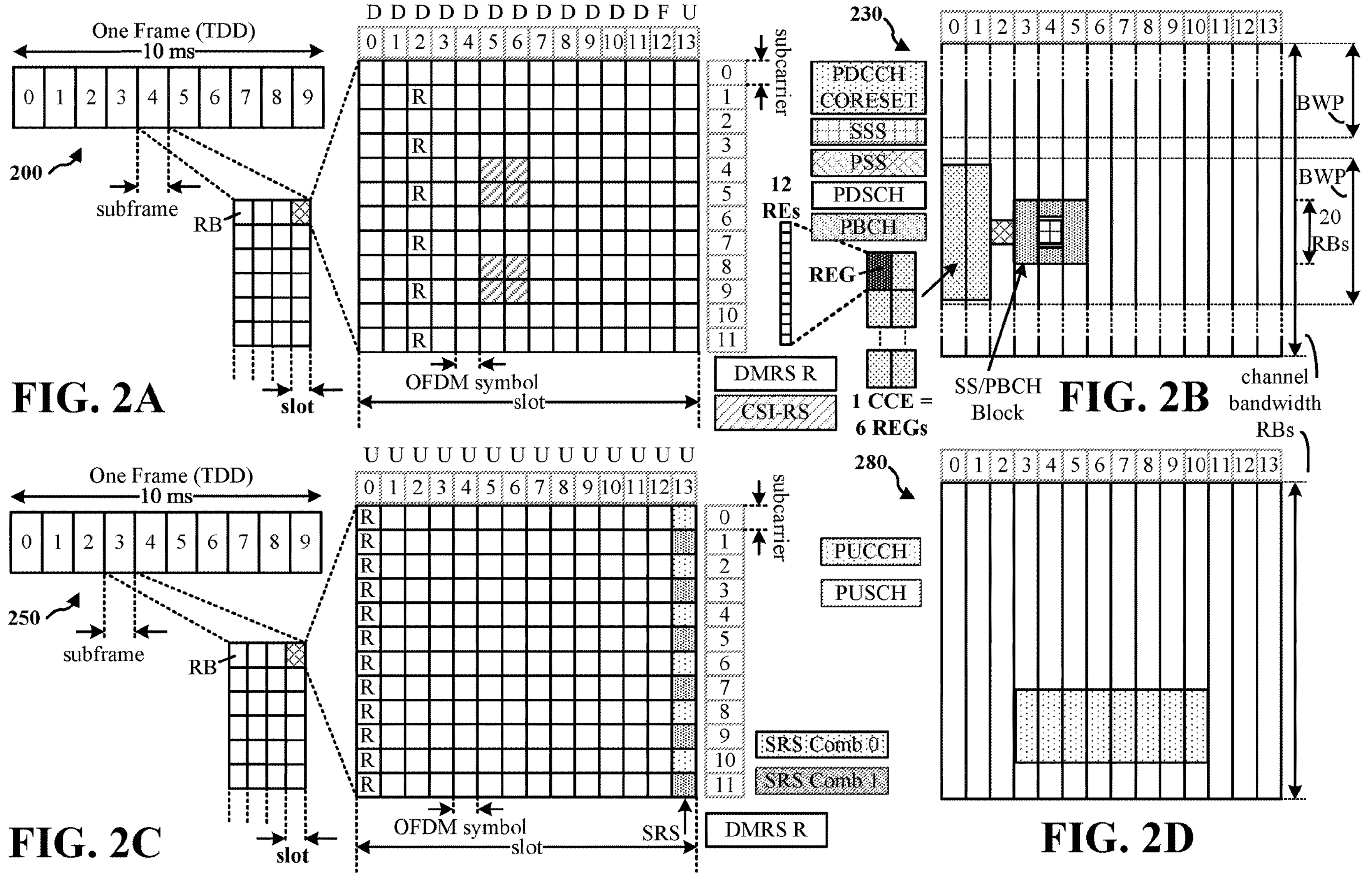
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
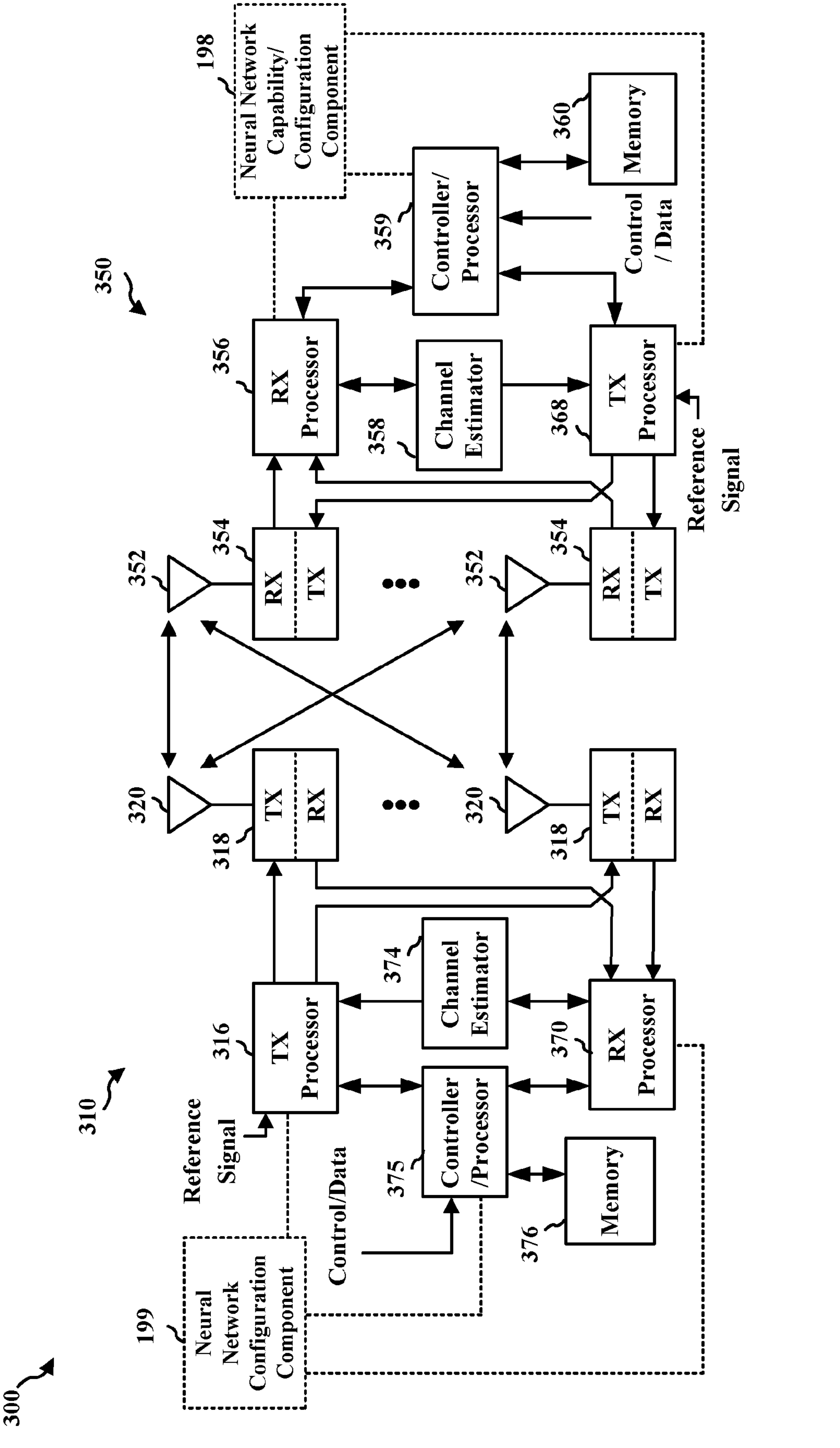
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may include a neural network capability/configuration component 198 that is configured to determine a processing time for at least one of training a neural network for CSI derivation or for reporting the CSI based on a trained neural network and providing the processing time to a network entity, such described in connection with FIG. 1.

At least one of the TX processor 316, the RX processor 370, and the controller/processor 375 may include a neural network configuration component 199 configured to receive a processing time from a UE for at least one of training a neural network for CSF or reporting the CSF based on a trained neural network; transmitting a configuration to the UE based on the processing time; and receiving CSI from the UE based on the configuration, such as described in connection with FIG. 1.

Some aspects of wireless communication may be based on a neural network or machine learning. As an example, a UE may include a neural network component or a machine learning component. In other examples, a base station, a TRP, or another network component may include a neural network or machine learning component. A UE and/or a base station (e.g., including a (CU) and/or a distributed unit (DU)) may use machine-learning algorithms, deep-learning algorithms, neural networks, reinforcement learning, regression, boosting, or advanced signal processing methods for aspects of wireless communication, e.g., with a base station, a TRP, another UE, etc.

Among others, examples of machine learning models or neural networks that may be included in a UE, TRP, base station, or network component include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivated, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with an input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. A neural network may include a network of interconnected nodes. An output of one node may be connected as the input to another node. Connections between nodes may be referred to as edges, and weights may be applied to the connections/edges to adjust the output from one node that is applied as the input to another node. Nodes may apply thresholds in order to determine whether, or when, to provide output to a connected node. The output of each node may be calculated as a non-linear function of a sum of the inputs to the node. The neural network may include any number of nodes and any type of connections between nodes. The neural network may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times.

Reinforcement learning is a type of machine learning that involves the concept of taking actions in an environment in order to maximize a reward. Reinforcement learning is a machine learning paradigm; other paradigms include supervised learning and unsupervised learning. Basic reinforcement may be modeled as a Markov decision process (MDP) having a set of environment and agent states, and a set of actions of the agent. The process may include a probability of a state transition based on an action and a representation of a reward after the transition. The agent's action selection may be modeled as a policy. The reinforcement learning may enable the agent to learn an optimal, or nearly-optimal, policy that maximizes a reward. Supervised learning may include learning a function that maps an input to an output based on example input-output pairs, which may be inferred from a set of training data, which may be referred to as training examples. The supervised learning algorithm analyzes the training data and provides an algorithm to map to new examples. Federated learning (FL) procedures that use edge devices as clients may rely on the clients being trained based on supervised learning.

Regression analysis may include statistical processes for estimating the relationships between a dependent variable (e.g., which may be referred to as an outcome variable) and independent variable(s). Linear regression is one example of regression analysis. Non-linear models may also be used. Regression analysis may include inferring causal relationships between variables in a dataset.

Boosting includes one or more algorithms for reducing bias and/or variance in supervised learning, such as machine learning algorithms that convert weak learners (e.g., a classifier that is slightly correlated with a true classification) to strong ones (e.g., a classifier that is more closely correlated with the true classification). Boosting may include iterative learning based on weak classifiers with respect to a distribution that is added to a strong classifier. The weak learners may be weighted related to accuracy. The data weights may be readjusted through the process. In some aspects described herein, an encoding device (e.g., a UE, base station, or other network component) may train one or more neural networks to learn dependence of measured qualities on individual parameters.

A wireless receiver may provide various types of CSI to a transmitting device. Among other examples, a UE may perform measurements on downlink signals, such as reference signal, from a base station and may provide a CSI report including any combination of a channel quality indicator (CQI), a precoding matrix indicator (PMI), a rank indicator (RI), a synchronization signal block/physical broadcast channel resource block indicator (SSBRI), a layer indicator (LI). The UE may perform the measurements and determine the CSI based on one or more channel state information reference signals (CSI-RS), SSB, channel state information interference measurement (CSI-IM) resources, etc. received from the base station. The base station may configure the UE to perform the CSI measurements, e.g., with a CSI measurement configuration. The base station may configure the UE with a CSI resource configuration that indicates the type of reference signal, e.g., a non-zero power CSI-RS (NZP CSI-RS), SSB, CSI-IM resource, etc. The base station may configure the UE with a CSI report configuration that indicates a mapping between the configured CSI measurements and the configured CSI resources and indicates for the UE to provide a CSI report to the base station.

There may be different types of CSI. A first type of CSI (which may be referred to as Type I CSI) may be for beam selection in which the UE selects a set of one or more beams indices (e.g., of beams 182' or 182") having better channel measurements and transmits CSI information for the set of beams to the base station.

A second type of CSI (which may be referred to as a Type II CSI) may be for beam combinations of a set of beams. The UE may determine better linear combination coefficients of various beams (e.g., of beams 182' or 182") and may transmit the beam indices for the set of beams as well as the coefficients for combining the beams. The UE may provide the coefficients for the beam combinations on a per sub-band basis. For example, the UE may provide the Type II CSI for each configured sub-band.

The present application provides for a type of CSI that uses machine learning or one or more neural networks to compress a channel and feedback the channel to the base station. The CSI may correspond to an additional type of CSI. The CSI may be referred to as a neural network based CSI, for example, or by other names. The CSI may use machine learning or one or more neural networks to measure and provide feedback about interference observed at the UE. The feedback may be provided to a base station, for example, for communication over an access link. In other examples, the feedback may be provided to a transmission reception point (TRP) or to another UE (e.g., for sidelink communication).

Figures 4A, 4B:
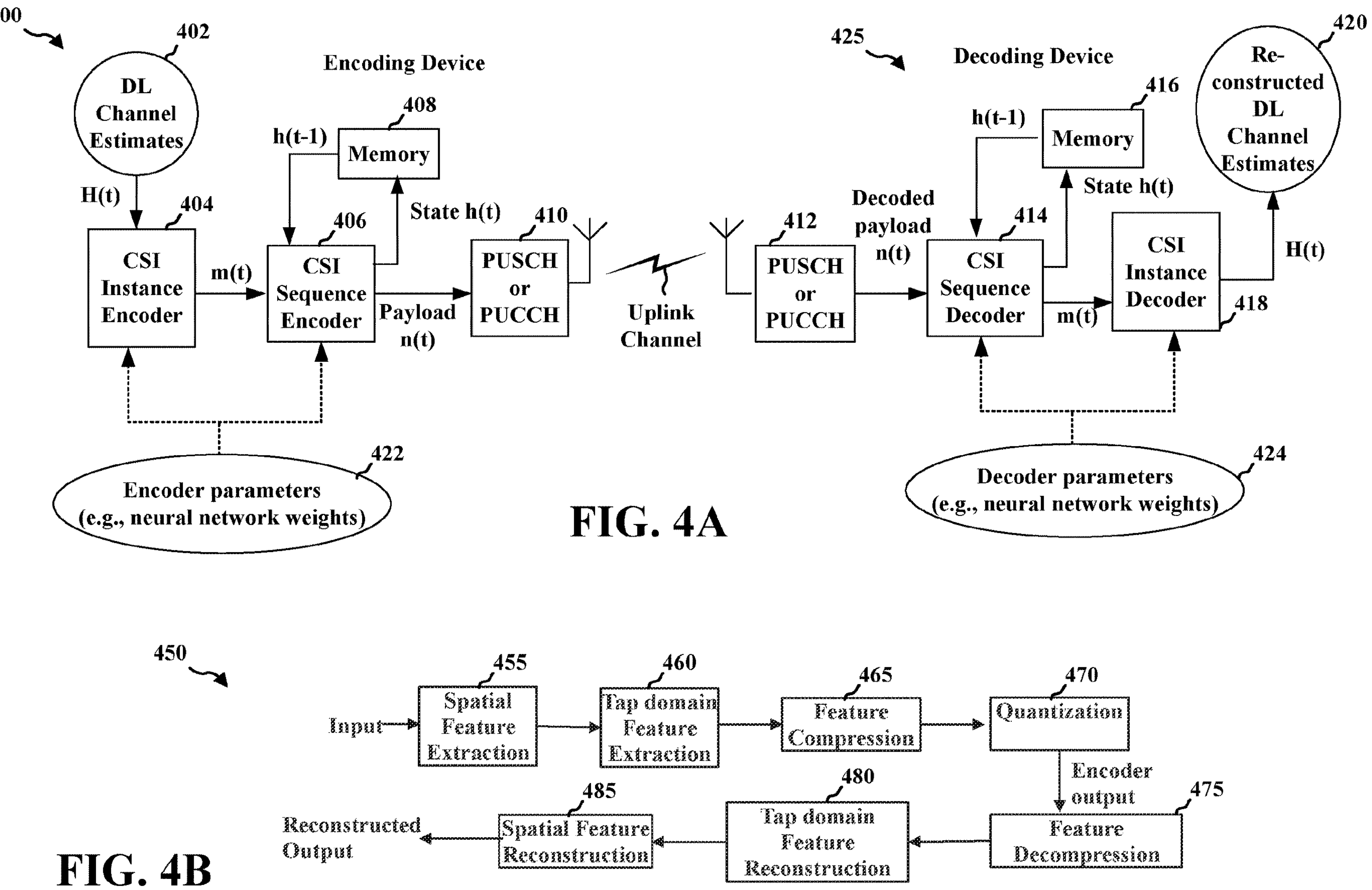
FIG. 4A is a diagram illustrating an example of an encoding device and a decoding device that use previously stored channel state information, in accordance with various aspects of the present disclosure.
FIG. 4B is a diagram illustrating an example associated with an encoding device and a decoding device, in accordance with various aspects of the present disclosure.

FIG. 4A illustrates an example architecture of components of an encoding device 400 and a decoding device 425 that use previously stored CSI, in accordance with aspects of the present disclosure. In some examples, the encoding device 400 may be a UE (e.g., 104 or 350), and the decoding device 425 may be a base station (e.g., 102, 180, 310), a TRP (e.g., TRP 103), another UE (e.g., UE 104), etc. The encoding device 400 and the decoding device 425 may save and use previously stored CSI and may encode and decode a change in the CSI from a previous instance. This may provide for less CSI feedback overhead and may improve performance. The encoding device 400 may also be able to encode more accurate CSI, and neural network training may be performed with the more accurate CSI. The example architecture of the encoding device 400 and the decoding device 425 may be used for the determination, e.g., computation, of CSI and provision of feedback from the encoding device 400 to the decoding device 425 including processing based on a neural network or machine learning.

As illustrated at 402, the encoding device 400 measures downlink channel estimates based on downlink signals from the base station, such as CSI-RS, SSB, CSI-IM resources, etc., that is input for encoding. A downlink channel estimate instance at time t is represented as H(t) and is provided to a CSI instance encoder 404 that encodes the single CSI instance for time t and outputs the encoded CSI instance for time t as m(t) to a CSI sequence encoder 406. The CSI sequence encoder 406 may take Doppler into account.

As shown in FIG. 4A, the CSI instance encoder 404 may encode a CSI instance into intermediate encoded CSI for each DL channel estimate in a sequence of DL channel estimates. The CSI instance encoder 404 (e.g., a feedforward network) may use neural network encoder weights θ. The intermediate encoded CSI may be represented as $m(t) \triangleq f_{enc,\theta}(H(t)$. The CSI sequence encoder 406 may be based on a long short term memory (LSTM) network, whereas the CSI instance encoder 404 may be based on a feedforward network. In other examples, the CSI sequence encoder 406 may be based on a gated recursive unit network or a recursive unit network. The CSI sequence encoder 406 (e.g., a Long Short-Term Memory (LSTM) network) may determine a previously encoded CSI instance h(t−1) from memory 408 and compare the intermediate encoded CSI m(t) and the previously encoded CSI instance h(t−1) to determine a change n(t) in the encoded CSI. The change n(t) may be a part of a channel estimate that is new and may not be predicted by the decoding device. The encoded CSI at this point may be represented by $[n(t), h_{enc}(t)] \triangleq g_{enc,\theta}(m(t), h_{enc}(t-1))$. CSI sequence encoder 406 may provide this change n(t) on the physical uplink shared channel (PUSCH) or the physical uplink control channel (PUCCH) 410, and the encoding device may transmit the change (e.g., information indicating the change) n(t) as the encoded CSI on the UL channel to the decoding device. Because the change is smaller than an entire CSI instance, the encoding device may send a smaller payload for the encoded CSI on the UL channel, while including more detailed information in the encoded CSI for the change. CSI sequence encoder 406 may generate encoded CSI h(t) based at least in part on the intermediate encoded CSI m(t) and at least a portion of the previously encoded CSI instance h(t−1). The CSI sequence encoder 406 may save the encoded CSI h(t) in memory 408.

The CSI sequence decoder 414 may receive encoded CSI on the PUSCH or PUCCH 412. The CSI sequence decoder 414 may determine that only the change n(t) of CSI is received as the encoded CSI. The CSI sequence decoder 414 may determine an intermediate decoded CSI m(t) based at least in part on the encoded CSI and at least a portion of a previous intermediate decoded CSI instance h(t−1) from memory 416 and the change. CSI instance decoder 418 may decode the intermediate decoded CSI m(t) into decoded CSI 420. The CSI sequence decoder 414 and the CSI instance decoder 418 may use neural network decoder weights ϕ. The intermediate decoded CSI may be represented by $[\hat{m}(t), h_{dec}(t)] \triangleq g_{dec,\phi}(n(t), h_{dec}(t-1))$. The CSI sequence decoder 414 may generate decoded CSI h(t) based at least in part on the intermediate decoded CSI m(t) and at least a portion of the previously decoded CSI instance h(t−1). The decoding device may reconstruct a DL channel estimate from the decoded CSI h(t), and the reconstructed channel estimate may be represented as H^(t)≜ f_(dec, ϕ) (m^(t)). The CSI sequence decoder 414 may save the decoded CSI h(t) in memory 416.

Because the change n(t) is smaller than an entire CSI instance, the encoding device may send a smaller payload on the UL channel. For example, if the DL channel has changed little from previous feedback, due to a low Doppler or little movement by the encoding device, an output of the CSI sequence encoder may be rather compact. In this way, the encoding device 400 may take advantage of a correlation of channel estimates over time. In some aspects, because the output is small, the encoding device 400 may include more detailed information in the encoded CSI for the change. In some aspects, the encoding device may transmit an indication (e.g., flag) to the decoding device 425 that the encoded CSI is temporally encoded (a CSI change). Alternatively, the encoding device 400 may transmit an indication that the encoded CSI is encoded independently of any previously encoded CSI feedback. The decoding device 425 may decode the encoded CSI without using a previously decoded CSI instance. In some aspects, a device, which may include the encoding device 400 or the decoding device 425, may train a neural network model using a CSI sequence encoder and a CSI sequence decoder.

In some aspects, CSI may be a function of a channel estimate (referred to as a channel response) H and interference N. There may be multiple ways to convey H and N. For example, the encoding device 400 may encode the CSI as $N^{-1/2}H$. The encoding device 400 may encode H and N separately. The encoding device 400 may partially encode Hand N separately, and then jointly encode the two partially encoded outputs. Encoding H and N separately maybe advantageous. Interference and channel variations may happen on different time scales. In a low Doppler scenario, a channel may be steady but interference may still change faster due to traffic or scheduler algorithms. In a high Doppler scenario, the channel may change faster than a scheduler-grouping of UEs. In some aspects, a device, which may include the encoding device 400 or the decoding device 425, may train a neural network model using separately encoded H and N.

In some aspects, a reconstructed DL channel $\hat{H}$ may faithfully reflect the DL channel H, and this may be called explicit feedback. In some aspects, $\hat{H}$ may capture only that information required for the decoding device 425 to derive rank and precoding. CQI may be fed back separately. CSI feedback may be expressed as m(t), or as n(t) in a scenario of temporal encoding. Similar to Type-II CSI feedback, m(t) may be structured to be a concatenation of rank index (RI), beam indices, and coefficients representing amplitudes or phases. In some aspects, m(t) may be a quantized version of a real-valued vector. Beams may be pre-defined (not obtained by training), or may be a part of the training (e.g., part of θ and ϕ and conveyed to the encoding device or the decoding device).

In some aspects, the decoding device 425 and the encoding device 400 may maintain multiple encoder and decoder networks, each targeting a different payload size (for varying accuracy vs. UL overhead tradeoff). For each CSI feedback, depending on a reconstruction quality and an uplink budget (e.g., PUSCH payload size), the encoding device 400 may choose, or the decoding device 425 may instruct the encoding device 400 to choose, one of the encoders to construct the encoded CSI. The encoding device 400 may send an index of the encoder along with the CSI based at least in part on an encoder chosen by the encoding device. Similarly, the decoding device 425 and the encoding device 400 may maintain multiple encoder and decoder networks to cope with different antenna geometries and channel conditions. Note that while some operations are described for the decoding device 425 and the encoding device 400, these operations may also be performed by another device, as part of a preconfiguration of encoder and decoder weights and/or structures, e.g., parameters 422 or 424.

As indicated above, FIG. 4A illustrates a non-limiting example to illustrate the concept. Other examples may differ from what is described with regard to FIG. 4A, and the concepts presented herein may be applied to other examples of an encoding or decoding device.

Based at least in part on encoding and decoding a data set using a neural network for uplink communication, the encoding device may transmit CSF with a reduced payload. This may conserve network resources that may otherwise have been used to transmit a full data set as sampled by the encoding device.

FIG. 4B is a diagram illustrating an example 450 associated with encoding and decoding a data set using a neural network for uplink communication, in accordance with various aspects of the present disclosure. An encoding device (e.g., UE 104, encoding device 400, and/or the like) may be configured to perform one or more operations on samples (e.g., data) received via one or more antennas of the encoding device 400 to compress the samples. A decoding device 425 (e.g., base station 102 or 180, decoding device 425, and/or the like) may be configured to decode the compressed samples to determine information, such as CSF.

In some aspects, the encoding device may identify a feature to compress. In some aspects, the encoding device may perform a first type of operation in a first dimension associated with the feature to compress. The encoding device may perform a second type of operation in other dimensions (e.g., in all other dimensions). For example, the encoding device may perform a fully connected operation on the first dimension and convolution (e.g., pointwise convolution) in all other dimensions.

In some aspects, the reference numbers identify operations that include multiple neural network layers and/or operations. Neural networks of the encoding device and the decoding device may be formed by concatenation of one or more of the referenced operations.

As shown by reference number 455, the encoding device may perform a spatial feature extraction on the data. As shown by reference number 460, the encoding device may perform a tap domain feature extraction on the data. In some aspects, the encoding device may perform the tap domain feature extraction before performing the spatial feature extraction. In some aspects, an extraction operation may include multiple operations. For example, the multiple operations may include one or more convolution operations, one or more fully connected operations, and/or the like, that may be activated or inactive. In some aspects, an extraction operation may include a residual neural network (ResNet) operation.

As shown by reference number 465, the encoding device may compress one or more features that have been extracted. In some aspects, a compression operation may include one or more operations, such as one or more convolution operations, one or more fully connected operations, and/or the like. After compression, a bit count of an output may be less than a bit count of an input.

As shown by reference number 470, the encoding device may perform a quantization operation. In some aspects, the encoding device may perform the quantization operation after flattening the output of the compression operation and/or performing a fully connected operation after flattening the output.

As shown by reference number 475, the decoding device may perform a feature decompression. As shown by reference number 480, the decoding device may perform a tap domain feature reconstruction. As shown by reference number 485, the decoding device may perform a spatial feature reconstruction. In some aspects, the decoding device may perform spatial feature reconstruction before performing tap domain feature reconstruction. After the reconstruction operations, the decoding device may output the reconstructed version of the encoding device's input.

In some aspects, the decoding device may perform operations in an order that is opposite to operations performed by the encoding device. For example, if the encoding device follows operations (a, b, c, d), the decoding device may follow inverse operations (D, C, B, A). In some aspects, the decoding device may perform operations that are fully symmetric to operations of the encoding device. This may reduce a number of bits needed for neural network configuration at the UE. In some aspects, the decoding device may perform additional operations (e.g., convolution operations, fully connected operation, ResNet operations, and/or the like) in addition to operations of the encoding device. In some aspects, the decoding device may perform operations that are asymmetric to operations of the encoding device.

Based at least in part on the encoding device encoding a data set using a neural network for uplink communication, the encoding device (e.g., a UE) may transmit CSF with a reduced payload. This may conserve network resources that may otherwise have been used to transmit a full data set as sampled by the encoding device.

As indicated above, FIG. 4B is provided merely as an example. Other examples may differ from what is described with regard to FIG. 4B.

The neural network based CSI based on machine learning or a neural network, such as described in connection with FIG. 4A, may compress the downlink channel in a more comprehensive manner. For example, in Type II CSI, a sub-band size may be fixed for all sub-bands for which the UE reports CSI. For example, the sub-band granularity (e.g., sub-band) size may not be a function of a sub-band index within a bandwidth part (BWP). For some frequency bands, the sub-band size may provide more granularity that is needed. In other frequency bands, the sub-band size may not provide enough granularity. The neural network based CSI may address the problems of a fixed sub-band size by providing CSI over an entire channel, for example. The neural network based CSI may be configured to compress some sub-bands with greater or lesser accuracy. The neural network based CSI may also provide benefits for multiple user multiple input multiple output (MU-MIMO) wireless communication, e.g., at a base station. The neural network based CSI provides direct information about the channel and the interference and allows the decoding device (such as a base station) to better group receivers (e.g., UEs).

Figure 5:
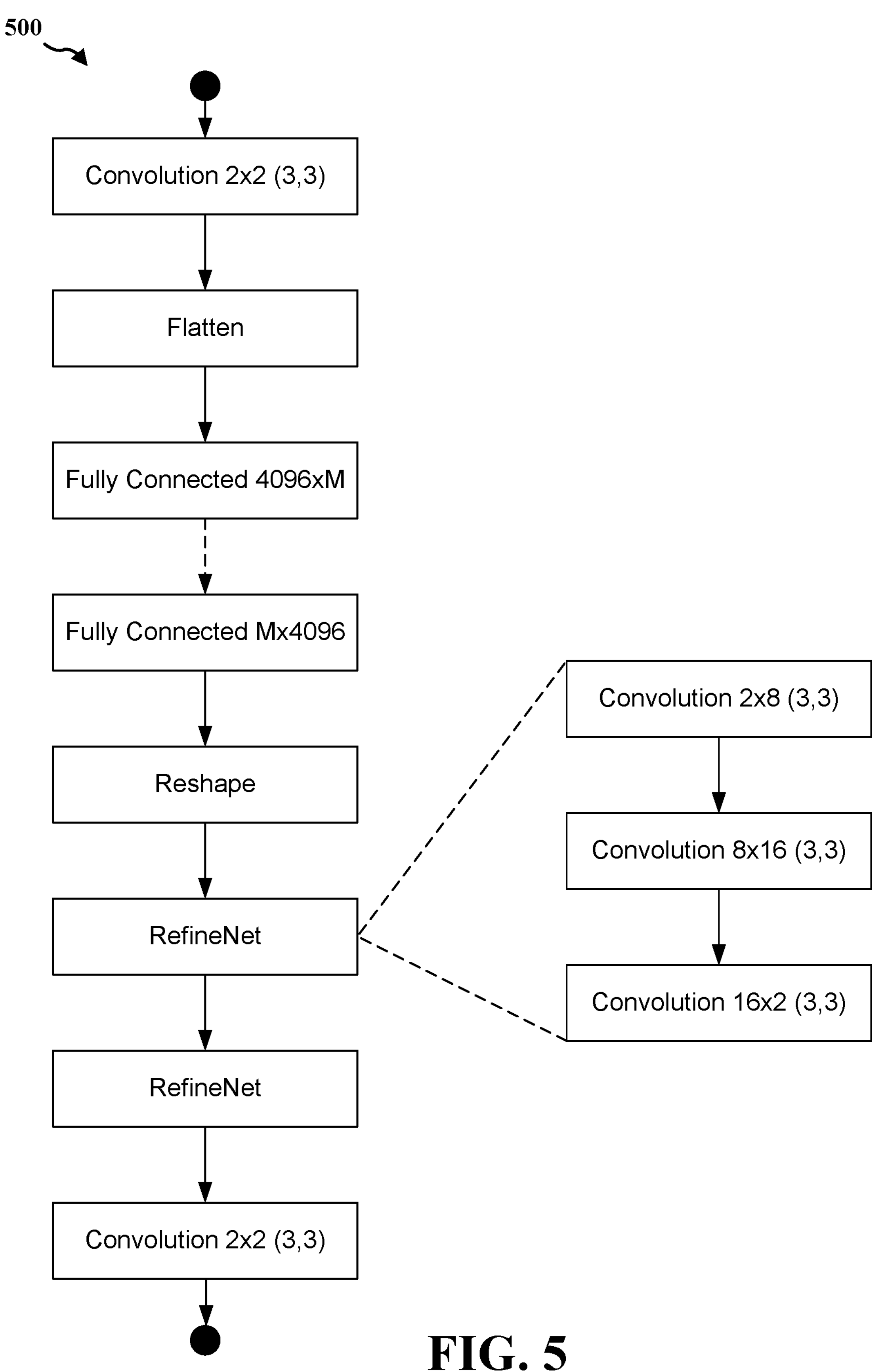
FIGS. 5-8 are diagrams illustrating examples associated with encoding and decoding a data set using a neural network for uplink communication, in accordance with various aspects of the present disclosure.

FIG. 5 is a diagram illustrating an example process 500 for an encoding device (e.g., UE 102, 350, encoding device 400, and/or the like) to perform one or more operations on data to compress the data. The decoding device (e.g., base station 102, 180, 310, decoding device 425, and/or the like) may be configured to decode the compressed data to determine information.

As used herein, a "layer" of a neural network is used to denote an operation on input data. For example, a convolution layer, a fully connected layer, and/or the like denote associated operations on data that is input into a layer. A convolution A×B operation refers to an operation that converts a number of input features A into a number of output features B. "Kernel size" refers to a number of adjacent coefficients that are combined in a dimension.

As used herein, "weight" is used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values.

As shown in example in FIG. 5, the encoding device may perform a convolution operation on samples. For example, the encoding device may receive a set of bits structured as a 2×64×32 data set that indicates IQ sampling for tap features (e.g., associated with multipath timing offsets) and spatial features (e.g., associated with different antennas of the encoding device). The convolution operation may be a 2×2 operation with kernel sizes of 3 and 3 for the data structure. The output of the convolution operation may be input to a batch normalization (BN) layer followed by a LeakyReLU activation, giving an output data set having dimensions 2×64×32. The encoding device may perform a flattening operation to flatten the bits into a 4096 bit vector. The encoding device may apply a fully connected operation, having dimensions 4096×M, to the 4096 bit vector to output a payload of M bits. The encoding device may transmit the payload of M bits to the decoding device.

The decoding device may apply a fully connected operation, having dimensions M×4096, to the M bit payload to output a 4096 bit vector. The decoding device may reshape the 4096 bit vector to have dimension 2×64×32. The decoding device may apply one or more refinement network (RefineNet) operations on the reshaped bit vector. For example, a RefineNet operation may include application of a 2×8 convolution operation (e.g., with kernel sizes of 3 and 3) with output that is input to a BN layer followed by a LeakyReLU activation that produces an output data set having dimensions 8×64×32, application of an 8×16 convolution operation (e.g., with kernel sizes of 3 and 3) with output that is input to a BN layer followed by a LeakyReLU activation that produces an output data set having dimensions 16×64×32, and/or application of a 16×2 convolution operation (e.g., with kernel sizes of 3 and 3) with output that is input to a BN layer followed by a LeakyReLU activation that produces an output data set having dimensions 2×64×32. The decoding device may also apply a 2×2 convolution operation with kernel sizes of 3 and 3 to generate decoded and/or reconstructed output.

As indicated above, FIG. 5 is provided merely as an example. Other examples may differ from what is described with regard to FIG. 5.

As described herein, an encoding device operating in a network may measure reference signals and/or the like to report to a decoding device. For example, a UE may measure reference signals during a beam management process to report channel state information feedback (CSF), may measure received power of reference signals from a serving cell and/or neighbor cells, may measure signal strength of inter-radio access technology (e.g., WiFi) networks, may measure sensor signals for detecting locations of one or more objects within an environment, and/or the like. However, reporting this information to the network entity may consume communication and/or network resources.

In some aspects described herein, an encoding device (e.g., a UE) may train one or more neural networks to learn dependence of measured qualities on individual parameters, isolate the measured qualities through various layers of the one or more neural networks (also referred to as "operations"), and compress measurements in a way that limits compression loss.

In some aspects, the encoding device may use a nature of a quantity of bits being compressed to construct a process of extraction and compression of each feature (also referred to as a dimension) that affects the quantity of bits. In some aspects, the quantity of bits may be associated with sampling of one or more reference signals and/or may indicate channel state information.

Figure 6:
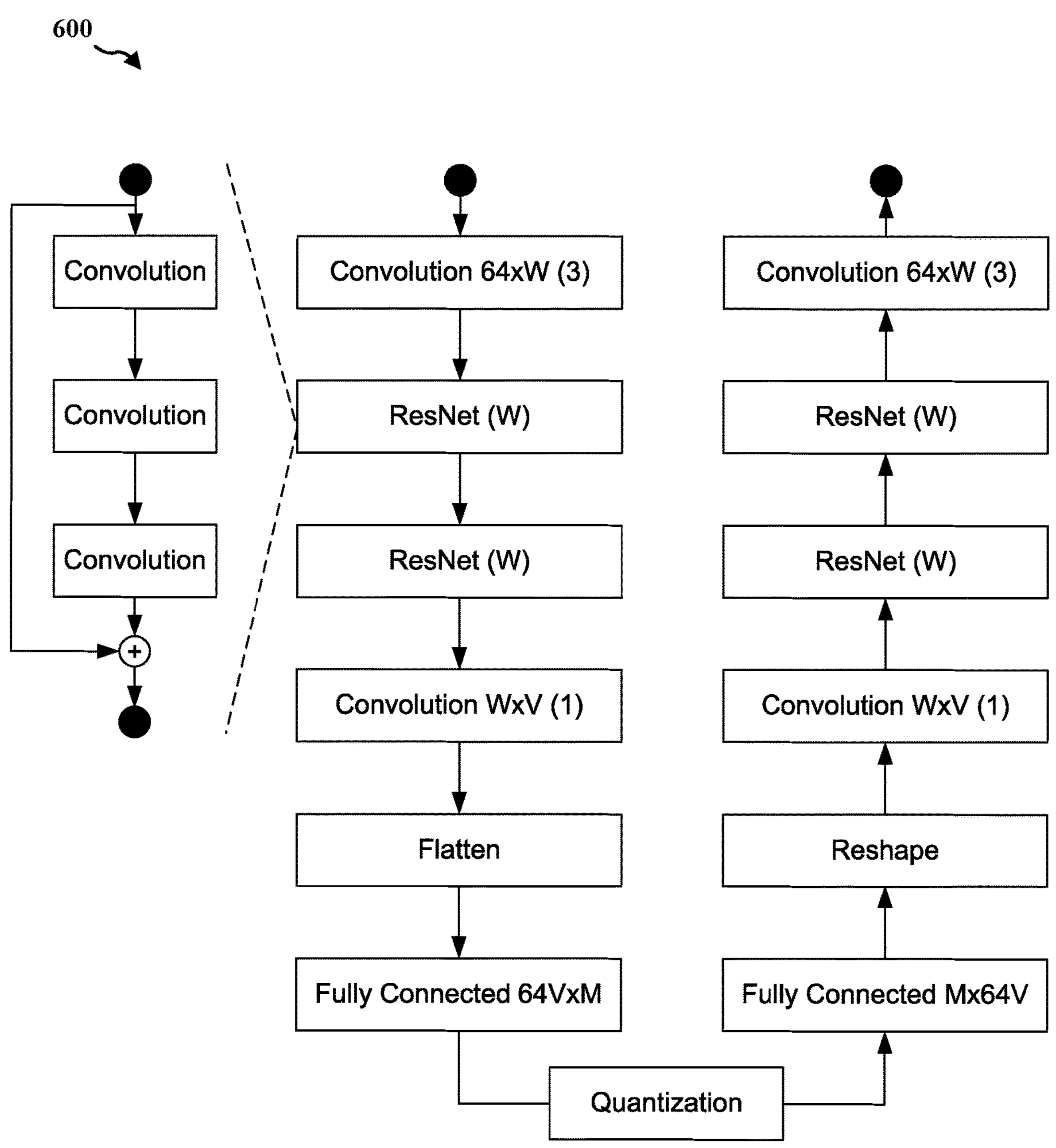

FIG. 6 is a diagram illustrating an example of operations 600 associated with encoding and decoding a data set using a neural network for uplink communication, in accordance with various aspects of the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 102 or 180, and/or the like) may be configured to decode the compressed samples to determine information, such as CSF.

As shown by the example in FIG. 6, the encoding device may receive sampling from antennas. For example, the encoding device may receive a 64×64 dimension data set based at least in part on a number of antennas, a number of samples per antenna, and a tap feature.

The encoding device may perform a spatial feature extraction, a short temporal (tap) feature extraction, and/or the like. In some aspects, this may be accomplished through the use of a 1-dimensional convolutional operation, that is fully connected in the spatial dimension (to extract the spatial feature) and simple convolution with a small kernel size (e.g., 3) in the tap dimension (to extract the short tap feature). Output from such a 64×W 1-dimensional convolution operation may be a W×64 matrix.

The encoding device may perform one or more ResNet operations. The one or more ResNet operations may further refine the spatial feature and/or the temporal feature. In some aspects, a ResNet operation may include multiple operations associated with a feature. For example, a ResNet operation may include multiple (e.g., 3) 1-dimensional convolution operations, a skip connection (e.g., between input of the ResNet and output of the ResNet to avoid application of the 1-dimensional convolution operations), a summation operation of a path through the multiple 1-dimensional convolution operations and a path through the skip connection, and/or the like. In some aspects, the multiple 1-dimensional convolution operations may include a W×256 convolution operation with kernel size 3 with output that is input to a BN layer followed by a LeakyReLU activation that produces an output data set of dimension 256×64, a 256×512 convolution operation with kernel size 3 with output that is input to a BN layer followed by a LeakyReLU activation that produces an output data set of dimension 512×64, and 512×W convolution operation with kernel size 3 that outputs a BN data set of dimension W×64. Output from the one or more ResNet operations may be a W×64 matrix.

The encoding device may perform a W×V convolution operation on output from the one or more ResNet operations. The W×V convolution operation may include a pointwise (e.g., tap-wise) convolution operation. The W×V convolution operation may compress spatial features into a reduced dimension for each tap. The W×V convolution operation has an input of W features and an output of V features. Output from the W×V convolution operation may be a V×64 matrix.

The encoding device may perform a flattening operation to flatten the V×64 matrix into a 64V element vector. The encoding device may perform a 64V×M fully connected operation to further compress the spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform an M×64V fully connected operation to decompress the low dimension vector of size M into a spatial-temporal feature data set. The decoding device may perform a reshaping operation to reshape the 64V element vector into a 2-dimensional V×64 matrix. The decoding device may perform a V×W (with kernel of 1) convolution operation on output from the reshaping operation. The V×W convolution operation may include a pointwise (e.g., tap-wise) convolution operation. The V×W convolution operation may decompress spatial features from a reduced dimension for each tap. The V×W convolution operation has an input of V features and an output of W features. Output from the V×W convolution operation may be a W×64 matrix.

The decoding device may perform one or more ResNet operations. The one or more ResNet operations may further decompress the spatial feature and/or the temporal feature. In some aspects, a ResNet operation may include multiple (e.g., 3) 1-dimensional convolution operations, a skip connection (e.g., to avoid application of the 1-dimensional convolution operations), a summation operation of a path through the multiple convolution operations and a path through the skip connection, and/or the like. Output from the one or more ResNet operations may be a W×64 matrix.

The decoding device may perform a spatial and temporal feature reconstruction. In some aspects, this may be accomplished through the use of a 1-dimensional convolutional operation that is fully connected in the spatial dimension (to reconstruct the spatial feature) and simple convolution with a small kernel size (e.g., 3) in the tap dimension (to reconstruct the short tap feature). Output from the 64×W convolution operation may be a 64×64 matrix.

In some aspects, values of M, W, and/or V may be configurable to adjust weights of the features, payload size, and/or the like.

As indicated above, FIG. 6 is provided merely as an example. Other examples may differ from what is described with regard to FIG. 6.

Figure 7:
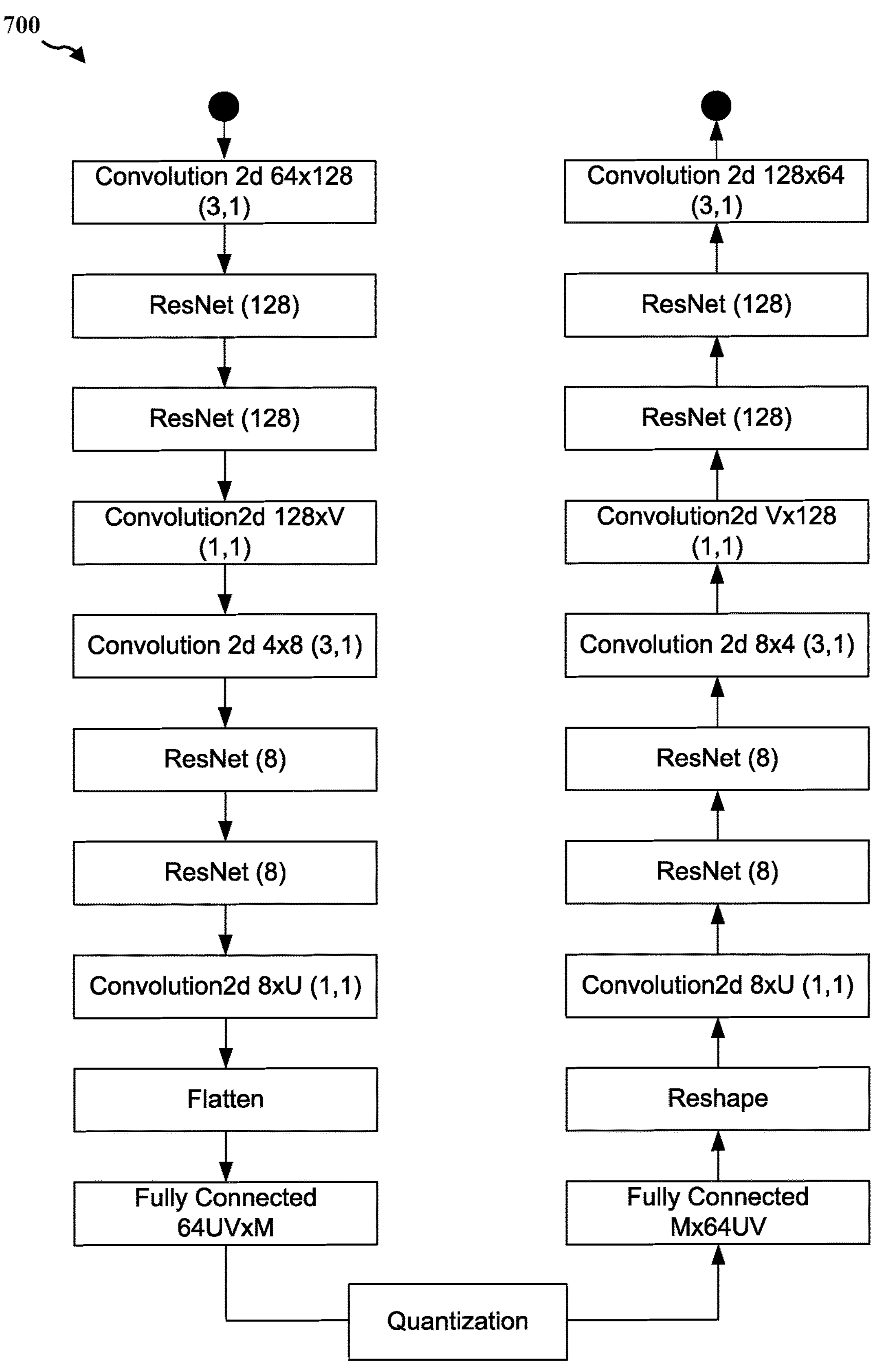

FIG. 7 is a diagram illustrating an example of operations 700 associated with encoding and decoding a data set using a neural network for uplink communication, in accordance with various aspects of the present disclosure. An encoding device (e.g., UE 104, encoding device 300, and/or the like) may be configured to perform one or more operations on samples (e.g., data) received via one or more antennas of the encoding device to compress the samples. A decoding device (e.g., base station 102 or 180, and/or the like) may be configured to decode the compressed samples to determine information, such as CSF. As shown by the example in FIG. 7, features may be compressed and decompressed in sequence. For example, the encoding device may extract and compress features associated with the input to produce a payload, and then the decoding device may extract and compress features associated with the payload to reconstruct the input. The encoding and decoding operations may be symmetric (as shown) or asymmetric.

As shown by FIG. 7, the encoding device may receive sampling from antennas. For example, the encoding device may receive a 256×64 dimension data set based at least in part on a number of antennas, a number of samples per antenna, and a tap feature. The encoding device may reshape the data to a (64×64×4) data set.

The encoding device may perform a 2-dimensional 64×128 convolution operation (with kernel sizes of 3 and 1). In some aspects, the 64×128 convolution operation may perform a spatial feature extraction associated with the decoding device antenna dimension, a short temporal (tap) feature extraction associated with the decoding device (e.g., base station) antenna dimension, and/or the like. In some aspects, this may be accomplished through the use of a 2D convolutional layer that is fully connected in a decoding device antenna dimension, a simple convolutional operation with a small kernel size (e.g., 3) in the tap dimension and a small kernel size (e.g., 1) in the encoding device antenna dimension. Output from the 64×W convolution operation may be a (128×64×4) dimension matrix.

The encoding device may perform one or more ResNet operations. The one or more ResNet operations may further refine the spatial feature associated with the decoding device and/or the temporal feature associated with the decoding device. In some aspects, a ResNet operation may include multiple operations associated with a feature. For example, a ResNet operation may include multiple (e.g., 3) 2-dimensional convolution operations, a skip connection (e.g., between input of the ResNet and output of the ResNet to avoid application of the 2-dimensional convolution operations), a summation operation of a path through the multiple 2-dimensional convolution operations and a path through the skip connection, and/or the like. In some aspects, the multiple 2-dimensional convolution operations may include a W×2W convolution operation with kernel sizes 3 and 1 with output that is input to a BN layer followed by a LeakyReLU activation that produces an output data set of dimension 2 W×64×V, a 2 W×4 W convolution operation with kernel sizes 3 and 1 with output that is input to a BN layer followed by a LeakyReLU activation that produces an output data set of dimension 4W×64×V, and 4W×W convolution operation with kernel sizes 3 and 1 that outputs a BN data set of dimension (128×64×4). Output from the one or more ResNet operations may be a (128×64×4) dimension matrix.

The encoding device may perform a 2-dimensional 128×V convolution operation (with kernel sizes of 1 and 1) on output from the one or more ResNet operations. The 128×V convolution operation may include a pointwise (e.g., tap-wise) convolution operation. The W×V convolution operation may compress spatial features associated with the decoding device into a reduced dimension for each tap. Output from the 128×V convolution operation may be a (4×64×V) dimension matrix.

The encoding device may perform a 2-dimensional 4×8 convolution operation (with kernel sizes of 3 and 1). In some aspects, the 4×8 convolution operation may perform a spatial feature extraction associated with the encoding device antenna dimension, a short temporal (tap) feature extraction associated with the encoding device antenna dimension, and/or the like. Output from the 4×8 convolution operation may be a (8×64×V) dimension matrix.

The encoding device may perform one or more ResNet operations. The one or more ResNet operations may further refine the spatial feature associated with the encoding device and/or the temporal feature associated with the encoding device. In some aspects, a ResNet operation may include multiple operations associated with a feature. For example, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (8×64×V) dimension matrix.

The encoding device may perform a 2-dimensional 8×U convolution operation (with kernel sizes of 1 and 1) on output from the one or more ResNet operations. The 8×U convolution operation may include a pointwise (e.g., tap-wise) convolution operation. The 8×U convolution operation may compress spatial features associated with the decoding device into a reduced dimension for each tap. Output from the 128×V convolution operation may be a (U×64×V) dimension matrix.

The encoding device may perform a flattening operation to flatten the (Ux64×V) dimension matrix into a 64UV element vector. The encoding device may perform a 64UV×M fully connected operation to further compress a 2-dimensional spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform an M×64UV fully connected operation to decompress the low dimension vector of size M into a spatial-temporal feature data set. The decoding device may perform a reshaping operation to reshape the 64UV element vector into a (Ux64×V) dimensional matrix. The decoding device may perform a 2-dimensional Ux8 (with kernel of 1, 1) convolution operation on output from the reshaping operation. The Ux8 convolution operation may include a pointwise (e.g., tap-wise) convolution operation. The Ux8 convolution operation may decompress spatial features from a reduced dimension for each tap. Output from the Ux8 convolution operation may be a (8×64×V) dimension data set.

The decoding device may perform one or more ResNet operations. The one or more ResNet operations may further decompress the spatial feature and/or the temporal feature associated with the encoding device. In some aspects, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (8×64×V) dimension data set.

The decoding device may perform a 2-dimensional 8×4 convolution operation (with kernel sizes of 3 and 1). In some aspects, the 8×4 convolution operation may perform a spatial feature reconstruction in the encoding device antenna dimension, and a short temporal feature reconstruction, and/or the like. Output from the 8×4 convolution operation may be a (V×64×4) dimension data set.

The decoding device may perform a 2-dimensional V×128 (with kernel of 1) convolution operation on output from the 2-dimensional 8×4 convolution operation to reconstruct a tap feature and a spatial feature associated with the decoding device. The V×128 convolution operation may include a pointwise (e.g., tap-wise) convolution operation. The V×128 convolution operation may decompress spatial features associated with the decoding device antennas from a reduced dimension for each tap. Output from the Ux8 convolution operation may be a (128×64×4) dimension matrix.

The decoding device may perform one or more ResNet operations. The one or more ResNet operations may further decompress the spatial feature and/or the temporal feature associated with the decoding device. In some aspects, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (128×64×4) dimension matrix.

The decoding device may perform a 2-dimensional 128×64 convolution operation (with kernel sizes of 3 and 1). In some aspects, the 128×64 convolution operation may perform a spatial feature reconstruction associated with the decoding device antenna dimension, a short temporal feature reconstruction, and/or the like. Output from the 128×64 convolution operation may be a (64×64×4) dimension data set.

In some aspects, values of M, V, and/or U may be configurable to adjust weights of the features, payload size, and/or the like. For example, a value of M may be 32, 64, 128, 256, or 512, a value of V may be 16, and/or a value of U may be 1.

As indicated above, FIG. 7 is provided merely as an example. Other examples may differ from what is described with regard to FIG. 7.

Figure 8:
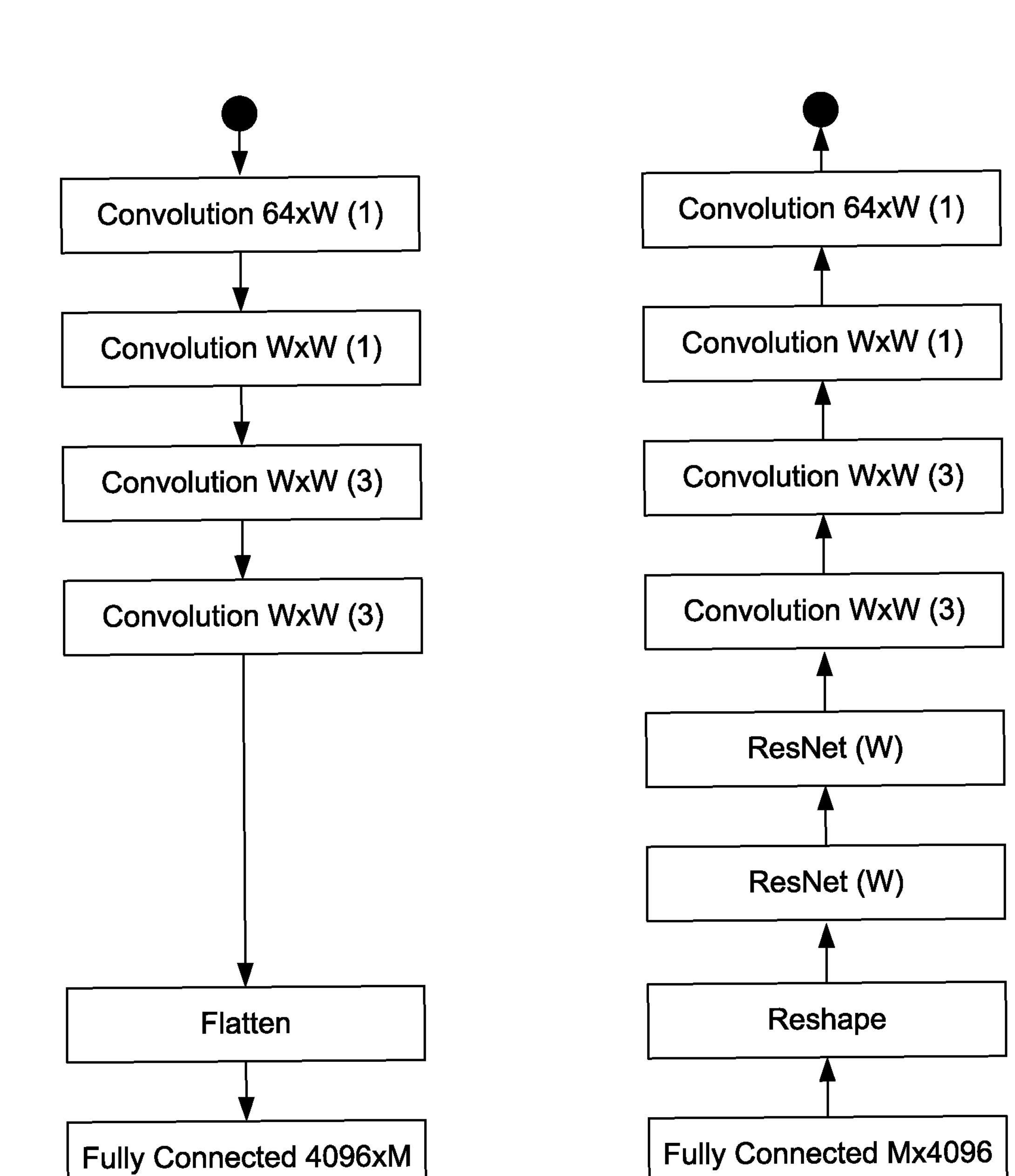

FIG. 8 is a diagram illustrating an example of operations 800 associated with encoding and decoding a data set using a neural network for uplink communication, in accordance with various aspects of the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 110, and/or the like) may be configured to decode the compressed samples to determine information, such as CSF. The encoding device and decoding device operations may be asymmetric. In other words, the decoding device may have a greater number of layers than the decoding device.

As shown by the example in FIG. 8, the encoding device may receive sampling from antennas. For example, the encoding device may receive a 64×64 dimension data set based at least in part on a number of antennas, a number of samples per antenna, and a tap feature.

The encoding device may perform a 64×W convolution operation (with a kernel size of 1). In some aspects, the 64×W convolution operation may be fully connected in antennas, convolution in taps, and/or the like. Output from the 64×W convolution operation may be a W×64 matrix. The encoding device may perform one or more W×W convolution operations (with a kernel size of 1 or 3). Output from the one or more W×W convolution operations may be a W×64 matrix. The encoding device may perform the convolution operations (with a kernel size of 1). In some aspects, the one or more W×W convolution operations may perform a spatial feature extraction, a short temporal (tap) feature extraction, and/or the like. In some aspects, the W×W convolution operations may be a series of 1-dimensional convolution operations.

The encoding device may perform a flattening operation to flatten the W×64 matrix into a 64W element vector. The encoding device may perform a 4096×M fully connected operation to further compress the spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform a 4096×M fully connected operation to decompress the low dimension vector of size M into a spatial-temporal feature data set. The decoding device may perform a reshaping operation to reshape the 6W element vector into a W×64 matrix.

The decoding device may perform one or more ResNet operations. The one or more ResNet operations may decompress the spatial feature and/or the temporal feature. In some aspects, a ResNet operation may include multiple (e.g., 3) 1-dimensional convolution operations, a skip connection (e.g., between input of the ResNet and output of the ResNet to avoid application of the 1-dimensional convolution operations), a summation operation of a path through the multiple 1-dimensional convolution operations and a path through the skip connection, and/or the like. In some aspects, the multiple 1-dimensinoal convolution operations may include a W×256 convolution operation with kernel size 3 with output that is input to a BN layer followed by a LeakyReLU activation that produces an output data set of dimension 256×64, a 256×512 convolution operation with kernel size 3 with output that is input to a BN layer followed by a LeakyReLU activation that produces an output data set of dimension 512×64, and 512×W convolution operation with kernel size 3 that outputs a BN data set of dimension W×64. Output from the one or more ResNet operations may be a W×64 matrix.

The decoding device may perform one or more W×W convolution operations (with a kernel size of 1 or 3). Output from the one or more W×W convolution operations may be a W×64 matrix. The encoding device may perform the convolution operations (with a kernel size of 1). In some aspects, the W×W convolution operations may perform a spatial feature reconstruction, a short temporal (tap) feature reconstruction, and/or the like. In some aspects, the W×W convolution operations may be a series of 1-dimensional convolution operations.

The encoding device may perform a W×64 convolution operation (with a kernel size of 1). In some aspects, the W×64 convolution operation may be a 1-dimensional convolution operation. Output from the 64×W convolution operation may be a 64×64 matrix.

In some aspects, values of M, and/or W may be configurable to adjust weights of the features, payload size, and/or the like.

As indicated above, FIG. 8 is provided merely as an example. Other examples may differ from what is described with regard to FIG. 8.

Figure 9:
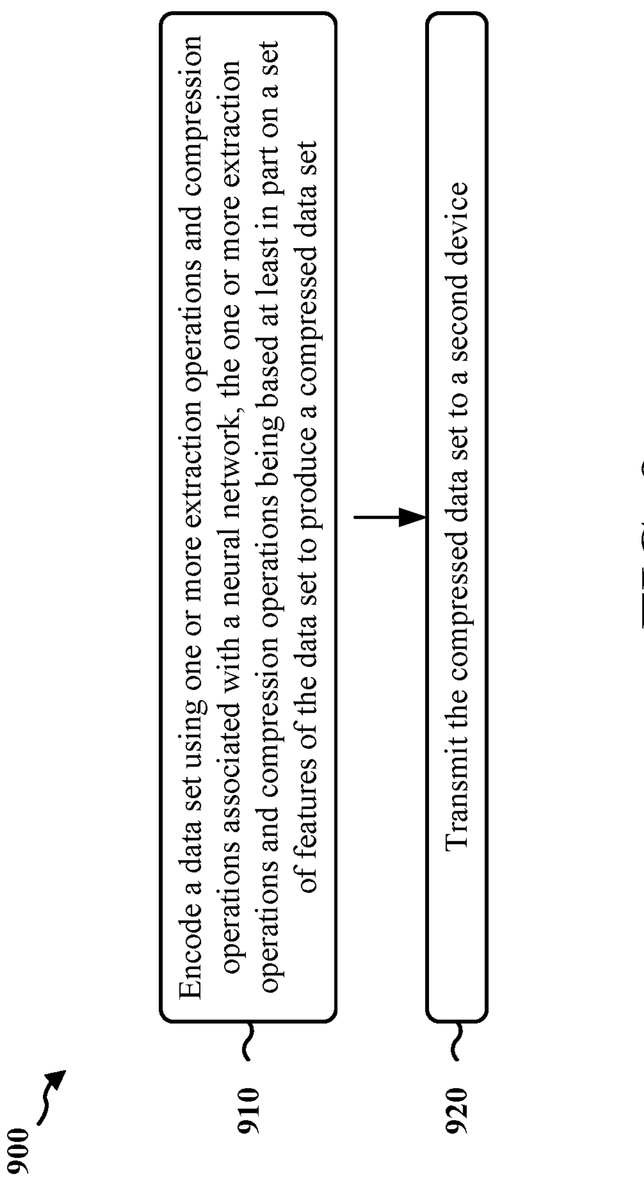
FIGS. 9 and 10 are diagrams illustrating example processes associated with encoding a data set using a neural network for uplink communication, in accordance with various aspects of the present disclosure.

FIG. 9 is a diagram illustrating an example process 900 performed, for example, by a first device, in accordance with various aspects of the present disclosure. Example process 900 is an example where the first device (e.g., an encoding device, UE 104, and/or the like) performs operations associated with encoding a data set using a neural network.

As shown in FIG. 9, in some aspects, process 900 may include encoding a data set using one or more extraction operations and compression operations associated with a neural network, the one or more extraction operations and compression operations being based at least in part on a set of features of the data set to produce a compressed data set (block 910). For example, the first device may encode a data set using one or more extraction operations and compression operations associated with a neural network, the one or more extraction operations and compression operations being based at least in part on a set of features of the data set to produce a compressed data set, as described above.

As further shown in FIG. 9, in some aspects, process 900 may include transmitting the compressed data set to a second device (block 920). For example, the first device may transmit the compressed data set to a second device, as described above.

Process 900 may include additional aspects, such as any single aspect or any combination of aspects described below and/or in connection with one or more other processes described elsewhere herein.

The data set may be based at least in part on sampling of one or more reference signals. The compressed data set may include channel state information feedback that is transmitted to the second device.

The method may further include identifying the set of features of the data set, wherein the one or more extraction operations and compression operations includes a first type of operation performed in a dimension associated with a feature of the set of features of the data set, and a second type of operation, that is different from the first type of operation, performed in remaining dimensions associated with other features of the set of features of the data set. The first type of operation may include a one-dimensional fully connected layer operation, and the second type of operation includes a convolution operation. The one or more extraction operations and compression operations may include multiple operations that include one or more of a convolution operation, a fully connected layer operation, or a residual neural network operation. The one or more extraction operations and compression operations may include a first extraction operation and a first compression operation performed for a first feature of the set of features of the data set, and a second extraction operation and a second compression operation performed for a second feature of the set of features of the data set.

The process may further include performing one or more additional operations on an intermediate data set that is output after performing the one or more extraction operations and compression operations. The one or more additional operations include one or more of a quantization operation, a flattening operation, or a fully connected operation.

The set of features of the data set may include one or more of a spatial feature, or a tap domain feature.

The one or more extraction operations and compression operations may include one or more of a spatial feature extraction using a one-dimensional convolution operation, a temporal feature extraction using a one-dimensional convolution operation, a residual neural network operation for refining an extracted spatial feature, a residual neural network operation for refining an extracted temporal feature, a pointwise convolution operation for compressing the extracted spatial feature, a pointwise convolution operation for compressing the extracted temporal feature, a flattening operation for flattening the extracted spatial feature, a flattening operation for flattening the extracted temporal feature, or a compression operation for compressing one or more of the extracted temporal feature or the extracted spatial feature into a low dimension vector for transmission.

The one or more extraction operations and compression operations include a first feature extraction operation associated with one or more features that are associated with a second device, a first compression operation for compressing the one or more features that are associated with the second device, a second feature extraction operation associated with one or more features that are associated with the first device, and a second compression operation for compressing the one or more features that are associated with the first device.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
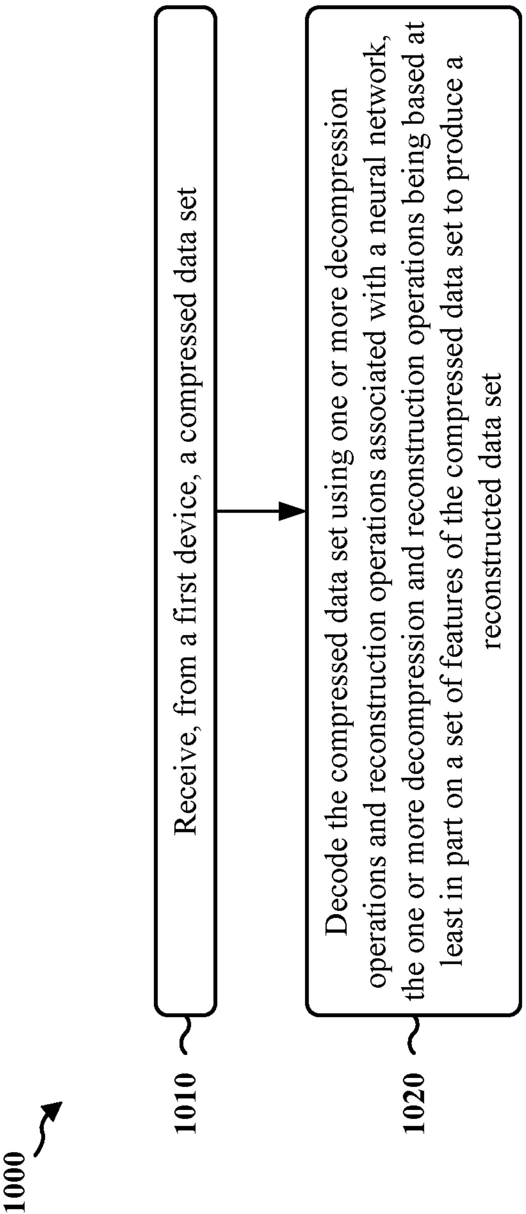

FIG. 10 is a diagram illustrating an example process 1000 performed, for example, by a second device, in accordance with various aspects of the present disclosure. Example process 1000 is an example where the second device (e.g., a decoding device, base station 102, 180, and/or the like) performs operations associated with decoding a data set using a neural network.

As shown in FIG. 10, in some aspects, process 1000 may include receiving, from a first device, a compressed data set (block 1010). For example, the second device may receive, from a first device, a compressed data set, as described above.

As further shown in FIG. 10, in some aspects, process 1000 may include decoding the compressed data set using one or more decompression operations and reconstruction operations associated with a neural network, the one or more decompression and reconstruction operations being based at least in part on a set of features of the compressed data set to produce a reconstructed data set (block 1020). For example, the second device may decode the compressed data set using one or more decompression operations and reconstruction operations associated with a neural network, the one or more decompression and reconstruction operations being based at least in part on a set of features of the compressed data set to produce a reconstructed data set, as described above.

Process 1000 may include additional aspects, such as any single aspect or any combination of aspects described below and/or in connection with one or more other processes described elsewhere herein.

The decoding the compressed data set using the one or more decompression operations and reconstruction operations may include performing the one or more decompression operations and reconstruction operations based at least in part on an assumption that the first device generated the compressed data set using a set of operations that are symmetric to the one or more decompression operations and reconstruction operations, or performing the one or more decompression operations and reconstruction operations based at least in part on an assumption that the first device generated the compressed data set using a set of operations that are asymmetric to the one or more decompression operations and reconstruction operations.

The compressed data set may be based at least in part on sampling by the first device of one or more reference signals.

The process may further include receiving the compressed data set includes receiving channel state information feedback from the first device.

The one or more decompression operations and reconstruction operations may include a first type of operation performed in a dimension associated with a feature of the set of features of the compressed data set, and a second type of operation, that is different from the first type of operation, performed in remaining dimensions associated with other features of the set of features of the compressed data set.

The first type of operation may include a one-dimensional fully connected layer operation, and wherein the second type of operation includes a convolution operation.

The one or more decompression operations and reconstruction operations may include multiple operations that include one or more of a convolution operation, a fully connected layer operation, or a residual neural network operation. Th one or more decompression operations and reconstruction operations may include a first operation performed for a first feature of the set of features of the compressed data set, and a second operation performed for a second feature of the set of features of the compressed data set.

The process 1000 may further include performing a reshaping operation on the compressed data set.

The set of features of the compressed data set may include one or more of a spatial feature, or a tap domain feature.

The one or more decompression operations and reconstruction operations may include one or more of a feature decompression operation, a temporal feature reconstruction operation, or a spatial feature reconstruction operation. The one or more decompression operations and reconstruction operations may include a first feature reconstruction operation performed for one or more features associated with the first device, and a second feature reconstruction operation performed for one or more features associated with the second device.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
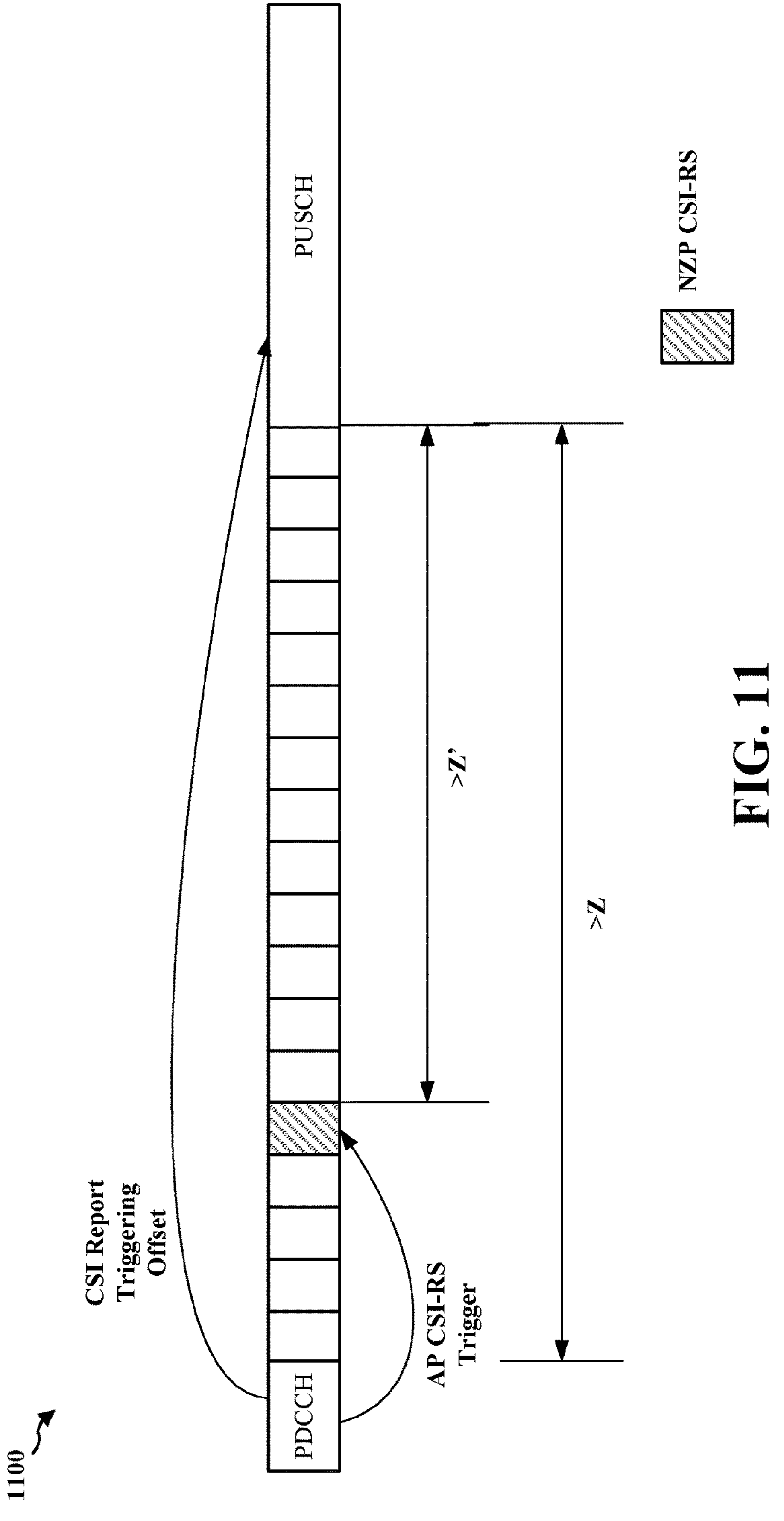
FIG. 11 illustrates example timing for channel state information (CSI) measurement.

FIG. 11 illustrates an example timeline 1100 for CSI report triggering. A base station may trigger aperiodic CSI reports from a UE by transmitting PDCCH to the UE indicating for the UE to measure CSI and transmit a CSI report. The UE not only uses available computational resources to calculate the report, it also uses time to perform the computation and to provide the report. FIG. 11 illustrates two timelines for aperiodic CSI report. A first processing time may be based on a number of, e.g., a minimum number of, OFDM symbols (Z) between the last symbol of the PDCCH triggering the aperiodic CSI report and the first symbol of the PUSCH which carries the CSI report. During this time, the UE decodes the PDCCH, performs possible CSI-RS/IM measurements (if the UE does not already have an up-to-date previous channel/interference measurement stored in its memory), performs possible channel estimation, calculates the CSI report, and performs the UCI multiplexing with UL-SCH.

However, if an aperiodic CSI-RS/IM is used with the report, this first processing time (e.g., which may be referred to as a first requirement) may not ensure the UE has sufficient time to compute the CSI, because the aperiodic CSI-RS could potentially be triggered close to the PUSCH transmission. Therefore, a second processing time may be based on a number of, e.g., a minimum number of, OFDM symbols (Z') between the last symbol of the aperiodic CSI-RS/IM used to calculate the report and the first symbol of the PUSCH which carries the CSI report.

The difference between the Z and Z' processing times may be that the Z requirement additionally encompasses a DCI decoding time for the UE. Thus, Z may be a few symbols larger than the corresponding Z' value, e.g., as shown in FIG. 11.

If the Z-criterion (or Z'-criterion) is not fulfilled, and the base station triggers the PUSCH for the UE to report the CSI too close to the PDCCH triggering the CSI report (or the aperiodic CSI-RS/IM for measurement), the UE can ignore the scheduling DCI, e.g., if the UE is not also scheduled with UL-SCH or HARQ-ACK, and the UE may not transmit the CSI. If the UE is scheduled to multiplex an UL-SCH or HARQ-ACK on the PUSCH, however, the UE may transmit the PUSCH but may pad the CSI report with dummy bits or transmit a stale CSI report. Table 1 illustrates examples of processing times to illustrate the concept that the processing times Z and Z' may be different based on different subcarrier spacings (O. Table 1 is merely an example, and processing times may be different than the examples illustrated in Table 1. Additionally, or alternatively, the processing times Z and Z' may different for different levels of latency, e.g., for low latency CSI and high latency CSI, or for beam reporting. Table 2 illustrates examples of processing times to illustrate the concept of processing times Z and Z' for ultra-low latency CSI reporting, and Table 3 illustrates examples of processing times to illustrate the concept of a difference between the processing times for Z' in milliseconds for high latency CSI and ultra-low latency CSI. Table 2 and Table 3 are merely examples to illustrate the concept of different processing times for different subcarrier spacing and different latencies. The processing times may be different than the examples illustrated in Table 1.

TABLE 1

| | Low Latency CSI [symbols] | | High Latency CSI [symbols] | | Beam Reporting [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | Min(44, $X_3$ + $KB_1$) | $X_3$ |
| 3 | 97 | 85 | 152 | 140 | Min(97, $X_4$ + $KB_2$) | $X_4$ |

TABLE 2

| | Ultra-Low Latency CSI [symbols] | |
|---|---|---|
| μ | $Z_1$ | $Z'_1$ |
| 0 | 10 | 8 |
| 1 | 13 | 44 |
| 2 | 25 | 21 |
| 3 | 43 | 36 |

TABLE 3

| μ | High Latency CSI | Ultra-low latency CSI |
|---|---|---|
| 0 | 2.64 msec | 0.57 msec |
| 1 | 2.46 msec | 0.4 msec |
| 2 | 2.5 msec | 0.375 msec |
| 3 | 1.2 msec | 0.32 msec |

The ultra-low latency CSI may provide a different processing timeline that may be applied in some circumstances, such as if a single low latency CSI report is triggered without multiplexing with either an uplink shared channel (UL-SCH) or HARQ-ACK and if the UE has a particular amount of computational resources (e.g., all of its CPUs) unoccupied. The UE may then allocate its computational resources to compute the CSI in a shorter amount of time. Thus, the CSI processing time for an aperiodic CSI report may vary based on numerology (subcarrier spacing), a number of ports, latency, etc.

Figure 12:
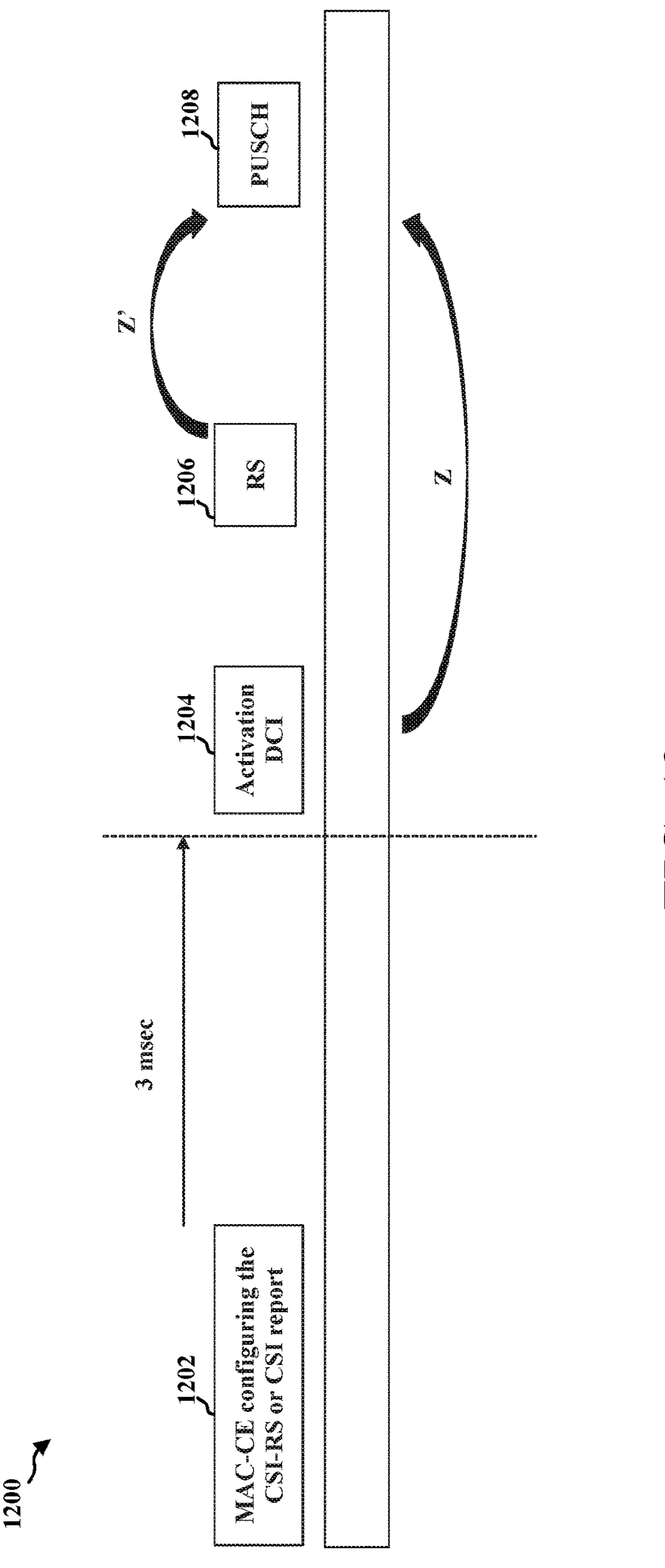
FIG. 12 illustrates example timing for configuration of CSI measurement.

Another type of CSI may be a semi-persistent CSI that may be triggered by downlink control information (DCI). FIG. 12 illustrates an example semi-persistent CSI timeline 1200 that the base station configures for the UE in a MAC-CE 1202 that configures the measurement of the CSI-RS and/or the CSI report. The base station then transmits a DCI 1204 that activates the configuration and triggers the UE to measure the reference signal 1206 and to transmit the report in the PUSCH 1208. Similar to FIG. 11, FIG. 12 illustrates the processing times Z and Z'. FIG. 12 illustrates an additional processing time that may be required between the MAC-CE 1202 that configures the CSI-RS or CSI report and the activation DCI 1204. For example, at least 3 milliseconds may be provided from the PDSCH configuring the CSI-RS or CSI report and the DCI that activates the configuration.

As described in connection with FIGS. 4A-10, a UE may perform measurements or provide reports such as CSI based on a neural network. As presented herein, the UE and the base station may determine the UE's processing times based, at least in part, on parameters of the neural network. The processing time may correspond to the time between a reference signal used for training in the neural network up to the time the UE has successfully trained the network. A successfully trained network may correspond to a neural network for which the UE is able to report back the CSI trained by the neural network, or being able to use the trained weights of the neural network to achieve a required/configured accuracy or QoS. The processing time may correspond to the time between the UE receiving a command to train the neural network and the time the UE has completed the training.

Figure 13:
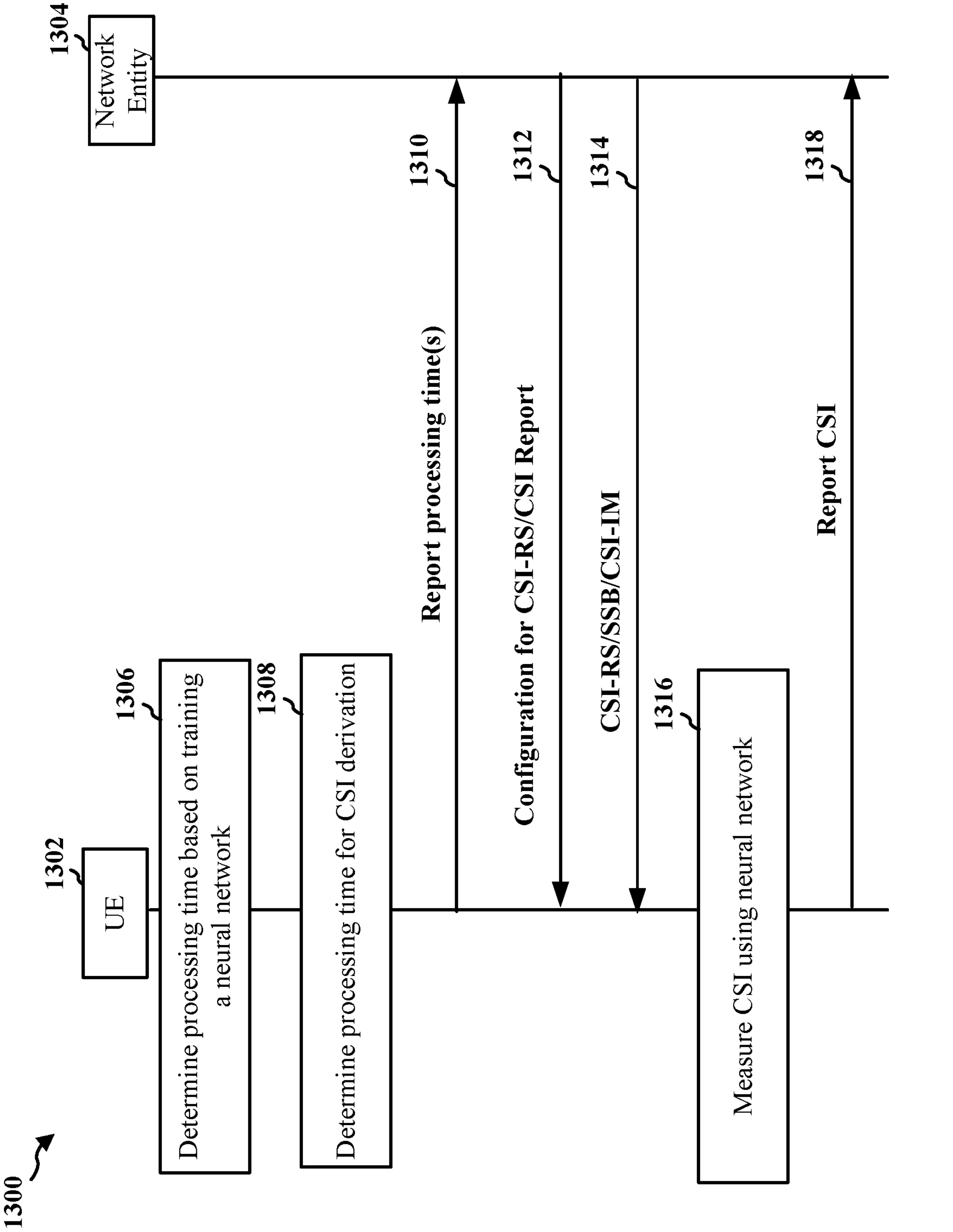
FIG. 13 illustrates an example communication flow between a UE and a network device.

FIG. 13 illustrates an example communication flow 1300 between a UE 1302 and a network entity 1304. The network device may be a base station, a TRP, or another UE. Although the example is described for a UE and a network entity, the aspects may be applied to a first wireless device as an encoding device and a second wireless device as a decoding device.

As illustrated at 1306, the UE 1302 may determine a processing time to train a neural network, e.g., for CSI derivation or other wireless communication measurement or output.

For example, the UE may determine an amount of time to train a specific neural network or the physical resources to train a network based on a number of layers in the neural network, such as the example layers described in connection with FIGS. 5-8. The UE may determine the processing time based on a number of weights in the neural network, such as described in connection with FIGS. 5-8. The UE may determine the processing time based on a type of the layers in the neural network, such as whether the layers are a fully connected layer, a one dimensional (1-D) convolution layer, a residual neural network layer, a pointwise convolution layer, etc. The UE may determine the processing time based on whether information from a previously trained neural network is used as a starting point to train the neural network. For example, the UE may consider whether quasi co-location (QCL) information is provided for training the neural network or whether a neural network state indication is provided for training the neural network. The UE may determine the processing time based on whether a single neural network or multiple neural networks are expected to be trained simultaneously. “Simultaneous” training may be used herein to refer to concurrent training, e.g., overlapping at least partially in time, of the multiple neural networks in at least one of a same component carrier, a same band, a same bandwidth part, a same band combination, a same frequency range, a same slot, a same subframe, or a same frame. The training may be performed, e.g., in a TDM manner in which one neural network is trained followed by the next until each of the neural networks is trained, for example. Simultaneously training may correspond to the number of training procedures for which the UE has not yet responded with a complete-training message, e.g., a message indicating that training is complete. In other words, after the UE receives the command to start training, this training procedure may be considered as active until the UE has reported back a complete training message. The complete training message may correspond to the report of the trained neural network. The UE may determine the processing time based on a procedure for which the neural network is being trained. For example, the UE may determine different times for training a neural network based on whether the neural network is being trained for CSI determination, demodulation, positioning determination, or waveform determination. The UE may determine the processing time based on a requested accuracy, e.g., a QoS that may be associated with the level of training. The UE may determine the processing time based on whether a single layer or multiple layers within the neural network are expected to be trained. The layers to be trained may be a subset of the number of layers in the neural network, for example. The UE may determine the processing time based on a sequence of the layers of the neural network, e.g., a type and order of the layers in the neural network. For example, a neural network that has a fully connected layer followed by a fully connected layer may have a different processing time that a neural network that has a residual neural network layer next to a fully connected layer. The processing time for training the neural network may be based on any combination of the examples of parameters or features described herein.

The UE may also determine a processing time from the time that the UE is triggered to provide a report until the UE provides a measurement, CSI, or outcome of the trained neural network. The processing time may be based on a fully trained neural network, for example. For example, at 1308, in FIG. 13, the UE may determine a processing time for CSI derivation based on a fully trained neural network. Although the example is described for determining a processing time for a CSI report in order to illustrate the concept, the concept may be applied to other measurements or outputs of a neural network for a wireless communication device. The UE may determine the CSI processing time based on an encoder output vector of the neural network, for example. In other examples, the UE may determine the CSI processing time based on an encoder input vector that is input to the neural network. The UE may determine the CSI processing time based on a vector that is computed in the neural network or based on a combination of vectors that are computed in the neural network. The UE may determine the CSI processing time based on a number of layers in the neural network. The UE may determine the CSI processing time based on a number of elements in the input vector, the output vector, and/or the intermediate vector(s) in the neural network. The UE may determine the CSI processing time based on the type of one or more layers in the neural network (e.g., fully connected, 1-D convolution, residual neural network, point-wise convolution layer, etc.). The UE may determine the CSI processing time based on a sequence of the layers in the neural network (e.g., a fully connected layer followed by a fully connected layer may have a different processing time that a neural network that has a residual neural network layer next to a fully connected layer). The UE may determine the CSI processing time based on any combination of the described factors.

As illustrated at 1310, after determining the processing time at 1306 and/or the processing time at 1308, the UE 1302 may provide the determine processing time to the network entity 1304. For example, the UE may report a capability based on the training time for training one or more neural networks and for derivation of an outcome with the neural network(s). The UE 1302 may report the processing time as a UE capability in higher layer signaling, in a MAC-CE, or in UCI. The UE may report the processing time per band, per band combination, per frequency range, per BWP, per numerology, per component carrier (CC), or based on a combination. Additionally, or alternatively, the UE may report the processing time for the different factors described in connection with the determination of the time. For example, the UE may report the processing time(s) per layer, per type of layer, per combination of layers, per length of input/output/intermediate vectors, per number of layers, per sequence of layers, etc.

The UE may report different levels of processing timelines, e.g., a slower time and a faster time, such as described in connection with the low latency, high latency, and ultra-low latency examples described in connection with Tables 1-3. The UE may report different levels of processing times for the same neural network, for the same layer, for the same layer combination, for the same sequence of layers, etc. the network entity 1304 may configure the UE to apply one of the reported timelines. In other examples, the UE may apply one of the reported timelines, e.g., based on a power saving feature at the UE. For example, the UE may apply the faster processing timeline in association with higher power consumption.

As illustrated at 1312, the network entity 1304 may configure the UE 1302 to measure CSI-RS and/or to report CSI. The network entity 1304 may configure the UE 1302 with one or more parameters for training the neural network for CSI derivation in some examples. The network entity 1304 may transmit a reference signal 1314, such as CSI-RS, SSB, CSI-IM resources, etc., for the UE to measure. At 1316, the UE 1302 measures CSI, or some other measurement or output, using the neural network, and reports the CSI 1318 to the network entity.

Figure 14B:
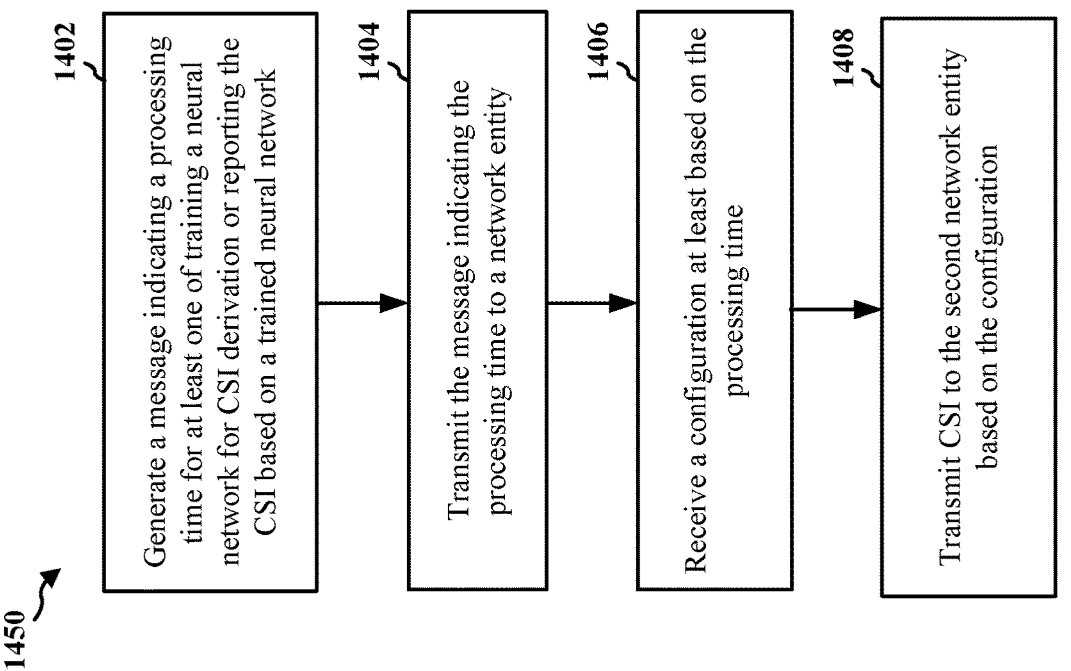
FIGS. 14A and 14B are flowcharts of a method of wireless communication including the transmission of information about a processing time for training a neural network for CSI derivation or reporting the CSI based on a trained neural network.
Figure 14A:
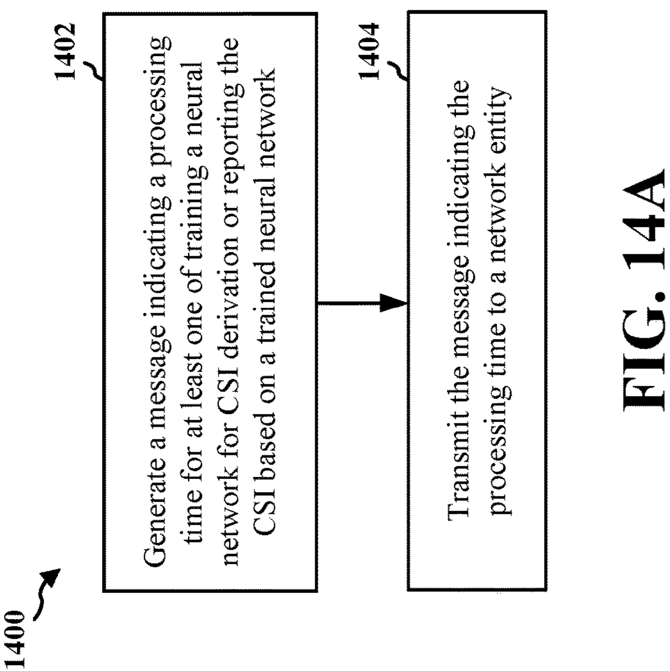

FIG. 14A is a flowchart 1400 of a method of wireless communication. The method may be performed by a first wireless device. The first wireless device may correspond to the encoding device 400 in FIG. 4A. In some examples, the method may be performed by a UE (e.g., the UE 104, 350) or by the apparatus 1502. Although the aspects of the method are described for an example of a UE, the aspects may be applied to other wireless devices.

At 1402, the UE generates a message indicating a processing time at the UE for at least one of training a neural network for channel state information derivation or reporting the CSI based on a trained neural network. For example, the processing time calculation component 1540 of the apparatus 1502 may perform the determination of the processing time to be included in the message, and the message may be generated by the capability component 1542 based on the determined processing time. FIG. 13 illustrates examples of the UE determining processing times at 1306 and 1308, for example. The processing time may correspond to an amount of time between a first time associated with a reference signal used for training in the neural network and a second time at which the UE has successfully trained the neural network. The neural network may be successfully trained when the UE is able to report back the CSI trained by the neural network, or is able to use trained weights of the neural network to achieve an accuracy or a QoS. The processing time may correspond to a time between the UE receiving a command to train the neural network and completing the training of the neural network.

The UE may determine the processing time for training the neural network based on at least one of: a number of layers in the neural network, a number of weights in the neural network, or a type of one or more layers of the neural network. The UE may determine the processing time for training the neural network based on use of information from a previously trained neural network. The information from the previously trained neural network may include at least one of QCL information or a neural network state indication from the previously trained neural network. The UE may determine the processing time for training the neural network based on an amount of neural networks or layers to be trained.

The UE may determine the processing time based on whether a single neural network or multiple neural networks are to be trained simultaneously. The multiple neural networks may be trained simultaneously based on concurrent training in at least one of: a same component carrier, a same band, a same bandwidth part, a same band combination, a same frequency range, a same slot, a same subframe, or a same frame. A neural network of the multiple neural networks may be considered trained simultaneously until the UE responds with a complete training message.

The UE may determine the processing time based on whether a single layer or multiple layers of the neural network are to be trained simultaneously. The UE may determine the processing time for training the neural network based on a sequence order of multiple layers of the neural network. The UE may determine the processing time for training the neural network based on a type of wireless signal procedure performed by the neural network. The type of the wireless signal procedure includes at least one of: channel state information determination, demodulation, positioning determination, or waveform determination. The UE may determine the processing time for training the neural network based on an accuracy level. The accuracy level may be based on a QoS, for example. The UE may determine the processing time based on any combination of the described parameters or factors.

The UE may determine the processing time for reporting the CSF based on at least one of: an encoder output vector, an encoder input vector, one of more vectors determined at the neural network, a number of layers in the neural network, a first number of elements in an input of the neural network, a second number of elements in an output of the neural network, a third number of elements in an intermediate vector of the neural network, a layer type of one or more layers of the neural network, an amount of neural networks for overlapped reporting, or a sequence order of multiple layers of the neural network, or any combination thereof.

At 1404, the UE provides the processing time to a first network entity. For example, the UE may transmit the message indicating the processing time to the first network entity. The processing time may be transmitted by the capability component 1542 via the transmission component 1534 and/or the cellular RF transceiver 1522, for example. The first network entity may be a base station, a TRP, or another UE. Although the example is described in connection with a UE and a network entity, the aspects of the method may also be performed by a first wireless device that provides the processing time to a second wireless device. In some examples, the first wireless device may correspond to the encoding device 400 and the second wireless device may correspond to the decoding device 425.

The UE may report the processing time as a UE capability, a MAC-CE, or UCI. The UE may report the processing time for at least one of a bandwidth part, a numerology, a component carrier, a band, a band combination, a frequency range, or one or more timeline factor. The one or more timeline factor may include at least one of: a layer, a layer type, a combination of layers, an input vector length, an output vector length, an intermediate vector length, a number of layers, or a sequence of layers.

FIG. 14B illustrates a flowchart 1450 of a method of wireless communication. The method may include aspects described in connection with FIG. 14A. The method may be performed by a UE (e.g., the UE 104, 350) or by the apparatus 1502. Aspects that have been described in connection with FIG. 14A, are shown with the same reference number. As illustrated at 1406, the UE may receive a configuration from a second network entity at least based on the processing time. For example, the configuration may be received by the configuration component 1544 of the apparatus 1502. In some examples, the second network entity may be the same as the first network entity. As an example, the UE may provide the processing time capability to a base station and may receive a configuration to measure and/or report the CSI from the base station. The UE may provide the processing time capability to another UE and may receive an indication to report CSI to the other UE. In other examples, the second network entity may be different than the first network entity. For example, the UE may report the processing time capability to a server and may receive a configuration to report CSI from a base station and may report the CSI to a base station.

In some examples, the UE may report a first processing time and a second processing time, at 1404 e.g., a slower and a faster processing time. Then, at 1406, the UE may receive a configuration from the second network entity to use the first processing time or the second processing time. Additionally, or alternatively, the UE may apply the first processing time or the second processing time based on a power saving feature of the UE.

At 1408 the UE may transmit CSI to the second network entity based on the configuration. The transmission of the CSI may be performed, e.g., by the CSI report component 1546 of the apparatus 1502.

Figure 15:
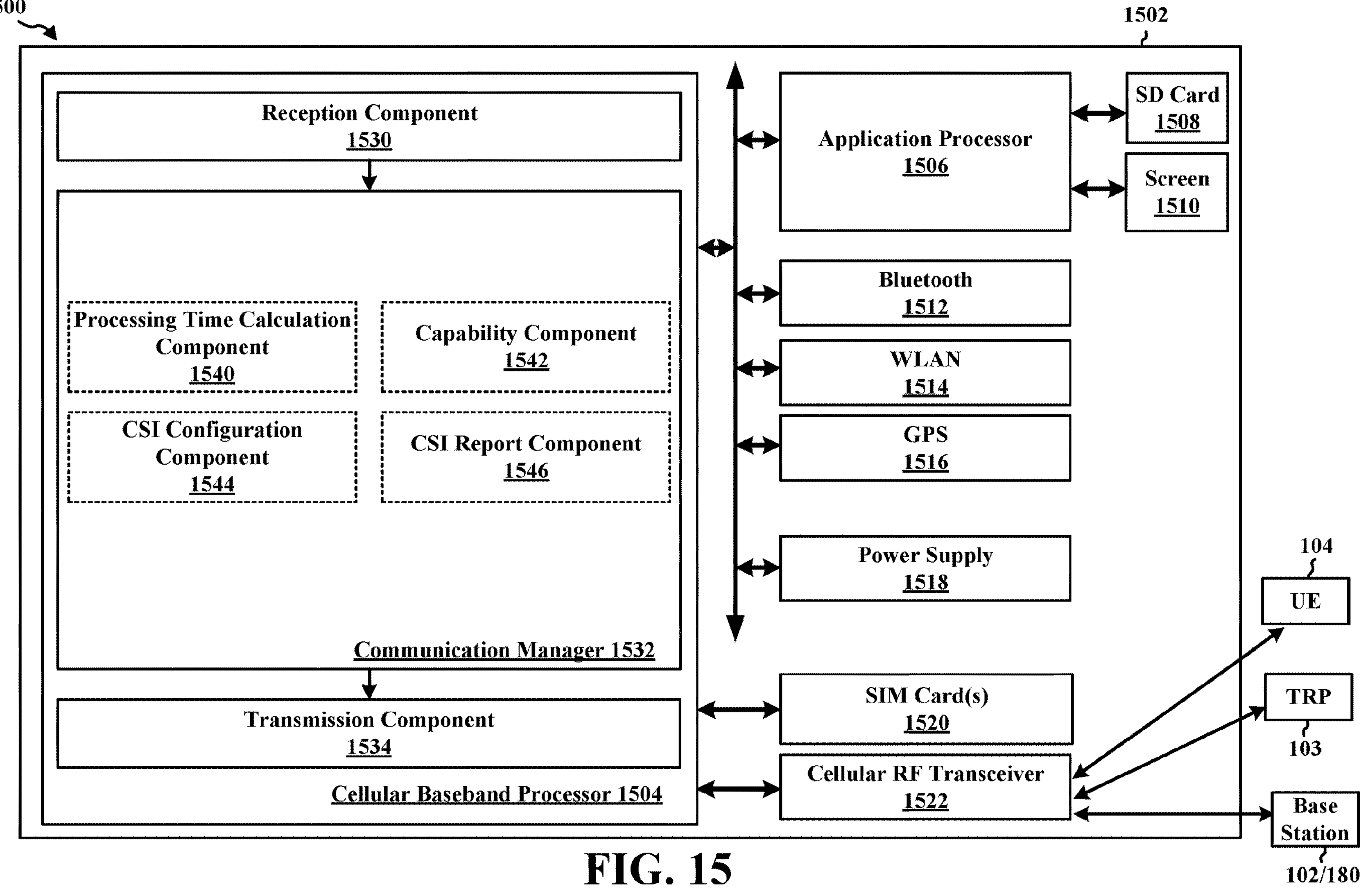
FIG. 15 is a diagram illustrating an example of a hardware implementation for an example apparatus configured to transmit information about a processing time for training a neural network for CSI derivation or reporting the CSI based on a trained neural network.

FIG. 15 is a diagram 1500 illustrating an example of a hardware implementation for an apparatus 1502. The apparatus 1502 may be a UE, a component of a UE, or may implement UE functionality. In some aspects, the apparatus 1502 includes a cellular baseband processor 1504 (also referred to as a modem) coupled to a cellular RF transceiver 1522. In some aspects, the apparatus 1502 may further include one or more of a subscriber identity module (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and/or a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the cellular baseband processor 1504, and in another configuration, the apparatus 1502 may be the entire UE (e.g., see 350 of FIG. 3) and include the additional modules of the apparatus 1502.

The communication manager 1532 includes a processing time calculation component 1540 that is configured to determine a processing time, e.g., as described in connection with 1402 in FIG. 14A or 14B. The communication manager 1532 further includes a capability component 1542 that is configured to provide the processing time to a first network entity, e.g., as described in connection with 1404 in FIG. 14A or 14B. The communication manager 1532 may further include a CSI configuration component 1544 that is configured to receive a configuration from a second network entity based on the processing time, e.g., as described in connection with 1406. The communication manager 1532 may further include a CSI report component 1546 that is configured to report the CSI to the second network entity based on the configuration, e.g., as described in connection with 1408.

The apparatus may include additional components that perform each of the blocks of the algorithm in the flowcharts of FIG. 14A or 14B. As such, each block in the flowcharts of FIG. 14A or 14B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for generating a message indicating a processing time at the UE for at least one of training a neural network for CSI derivation or reporting the CSI based on a trained neural network (e.g., processing time calculation component 1540 and/or capability component 1542); and means for providing the processing time to a first network entity (e.g., capability component 1542, the transmission component 1534, and/or the transceiver 1522). The apparatus 1502 may further include means for determining a processing time at the UE for at least one of training a neural network for CSI derivation or reporting the CSI based on a trained neural network (e.g., processing time calculation component 1540 of the communication manager 1532). The apparatus may further include means for receiving a configuration from a second network entity based on the processing time (e.g., the CSI configuration component 1544 of the communication manager 1532). The apparatus may further include means for transmitting the CSI to the second network entity based on the configuration (e.g., the CSI report component 1546, the transmission component 1534, and/or the transceiver 1522). The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
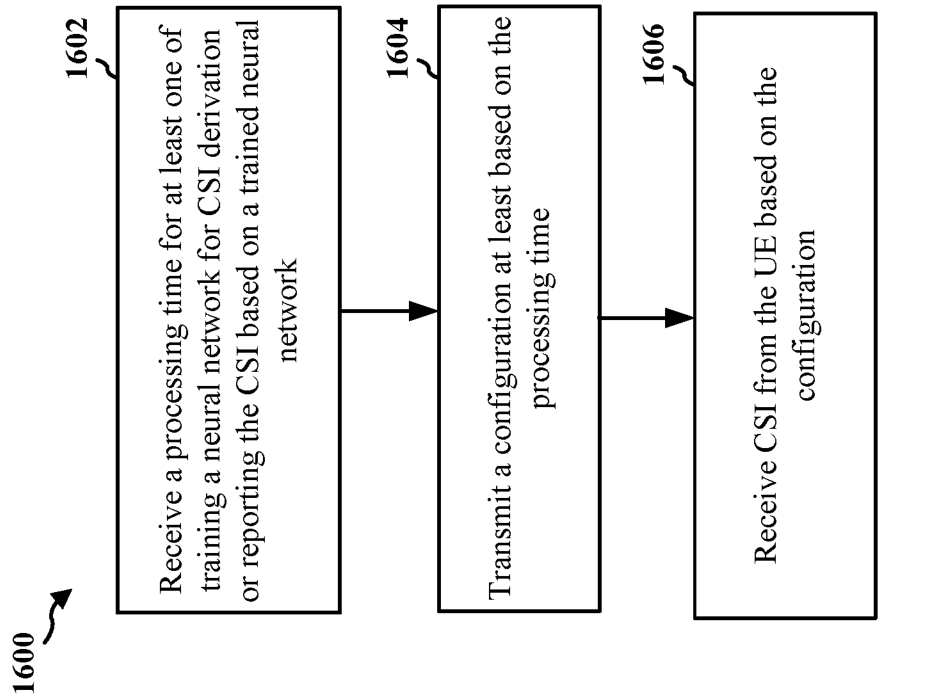
FIG. 16 is a flowchart of a method of wireless communication including the reception of information about a processing time for training a neural network for CSI derivation or reporting the CSI based on a trained neural network.

FIG. 16 is a flowchart 1600 of a method of wireless communication. The method may be performed by a first wireless device. The first wireless device may correspond to the decoding device 425 in FIG. 4A. In some examples, the method may be performed by a network entity, such as a base station, a TRP, or UE. The method may be performed by the apparatus 1702. Although FIG. 16 shows example blocks of a flowchart 1600, in some aspects, the method of wireless communication may include additional blocks, fewer blocks, different blocks, or differently arranged blocks than those depicted in FIG. 16. Additionally, or alternatively, two or more of the blocks of flowchart 1600 may be performed in parallel.

At 1602, the network entity receives a processing time from a UE for at least one of training a neural network for channel state information derivation or reporting the CSI based on a trained neural network. The reception may be performed, e.g., by the CSI processing time component 1740. The processing time may correspond to an amount of time between a first time associated with a reference signal used for training in the neural network and a second time at which the UE has successfully trained the neural network. The neural network may be successfully trained when the UE is able to report back the CSI trained by the neural network, or is able to use trained weights of the neural network to achieve an accuracy or a QoS. The processing time may correspond to a time between the UE receiving a command to train the neural network and completing the training of the neural network.

The processing time for training the neural network may be based on at least one of: a number of layers in the neural network, a number of weights in the neural network, or a type of one or more layers of the neural network. The processing time for training the neural network may be based on use of information from a previously trained neural network. The information from the previously trained neural network may include at least one of QCL information or a neural network state indication from the previously trained neural network. The processing time for training the neural network may be based on an amount of neural networks or layers to be trained.

The processing time for training the neural network may be based on whether a single neural network or multiple neural networks are to be trained simultaneously. The multiple neural networks may be trained simultaneously based on concurrent training in at least one of: a same component carrier, a same band, a same bandwidth part, a same band combination, a same frequency range, a same slot, a same subframe, or a same frame. A neural network of the multiple neural networks may be considered trained simultaneously until the UE responds with a complete training message.

The processing time for training the neural network may be based on whether a single layer or multiple layers of the neural network are to be trained simultaneously. The processing time for training the neural network may be based on a sequence order of multiple layers of the neural network. The processing time for training the neural network may be based on a type of wireless signal procedure performed by the neural network. The type of the wireless signal procedure includes at least one of: channel state information determination, demodulation, positioning determination, or waveform determination. The processing time for training the neural network may be based on an accuracy level. The accuracy level may be based on a QoS, for example. The processing time for training the neural network may be based on any combination of the described parameters or factors.

The processing time for reporting the CSI may be based on at least one of: an encoder output vector, an encoder input vector, one of more vectors determined at the neural network, a number of layers in the neural network, a first number of elements in an input of the neural network, a second number of elements in an output of the neural network, a third number of elements in an intermediate vector of the neural network, a layer type of one or more layers of the neural network, an amount of neural networks for overlapped reporting, or a sequence order of multiple layers of the neural network, or any combination thereof.

The network entity may receive the processing time as a UE capability, a MAC-CE, or UCI. The UE may report the processing time for at least one of a bandwidth part, a numerology, a component carrier, a band, a band combination, a frequency range, or one or more timeline factor. The one or more timeline factor may include at least one of: a layer, a layer type, a combination of layers, an input vector length, an output vector length, an intermediate vector length, a number of layers, or a sequence of layers.

At 1604, the network entity transmits a configuration to the UE based on the processing time. For example, the configuration may be transmitted by the CSI configuration component 1744 of the apparatus 1702.

In some examples, the UE may report a first processing time and a second processing time, at 1602 e.g., a slower and a faster processing time. Then, at 1604, the base station may transmit a configuration for the UE to use the first processing time or the second processing time At 1606, the network entity receives the CSI from the UE based on the configuration. The reception of the CSI may be performed, e.g., by the CSI report component 1748 of the apparatus 1502. FIG. 13 illustrates an example of a network entity 1304 receiving CSI 1318 from a UE 1302 based on a configuration 1312, the configuration being provided after the network entity 1304 receives the processing time information, at 1310, from the UE 1302.

Figure 17:
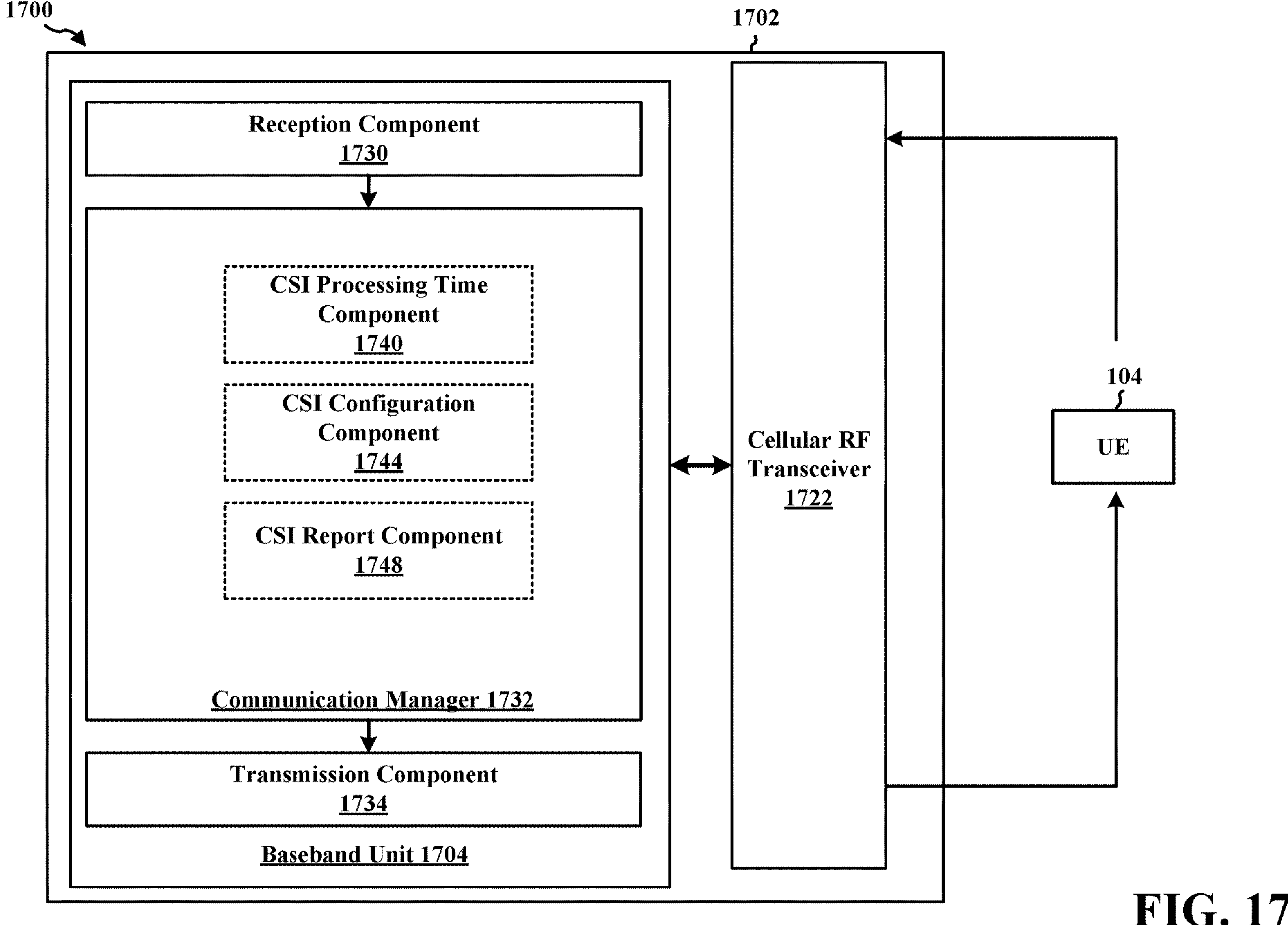
FIG. 17 is a diagram illustrating an example of a hardware implementation for an example apparatus configured to receive information about a processing time for training a neural network for CSI derivation or reporting the CSI based on a trained neural network.

FIG. 17 is a diagram 1700 illustrating an example of a hardware implementation for an apparatus 1702. In some aspects, the apparatus 1702 may be a base station, a component of a base station, or may implement base station functionality. In some aspects, the apparatus 1702 may be another network component. The apparatus 1702 may include a baseband unit 1704. The baseband unit 1704 may communicate through a cellular RF transceiver with the UE 104, the TRP 103, and/or the base station 102/180, in some examples. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 and may include the memory 376 and/or at least one of the TX processor 316, the RX processor 370, and the controller/processor 375.

The communication manager 1732 includes a CSI processing time component 1740 that is configured to receive a processing time from a user equipment (UE) for at least one of training a neural network for channel state information derivation or reporting the CSI based on a trained neural network, e.g., as described in connection with 1602. The communication manager 1732 further includes a CSI configuration component 1744 that is configured to transmit a configuration to the UE based on the processing time, e.g., as described in connection with 1604. The communication manager 1732 further includes a CSI report component 1748 that is configured to receive a CSI report based on the configuration, e.g., as described in connection with 1606.

The apparatus may include additional components that perform each of the blocks of the algorithm in the flowchart of FIG. 16. As such, each block in the flowcharts of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband unit 1704, includes means for receiving a processing time from a user equipment (UE) for at least one of training a neural network for channel state information derivation or reporting the CSI based on a trained neural network (e.g., the CSI processing time component 1740, the reception component 1730, and/or the transceiver 1722); means for transmitting a configuration to the UE based on the processing time (e.g., CSI configuration component 1744, the transmission component 1734, and/or the transceiver 1722); and means for receiving the CSI from the UE based on the configuration (e.g., CSI report component 1748, the reception component 1730, and/or the transceiver 1722). The means may be one or more of the components of the apparatus 1702 configured to perform the functions recited by the means. As described supra, the apparatus 1702 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and aspects thereof may be combined with aspects of other examples or teaching described herein, without limitation.

Aspect 1 is a method of wireless communication at a UE, comprising: generating a message indicating a processing time at the UE for at least one of training a neural network for channel state information derivation or reporting the CSI based on a trained neural network; and transmitting the message indicating the processing time to a first network entity.

In aspect 2, the method of aspect 1 further includes that the first network entity is a base station, a TRP, or another UE.

In aspect 3, the method of aspect 1 or 2 further includes that the processing time corresponds to an amount of time between a first time associated with a reference signal used for training in the neural network and a second time at which the UE has successfully trained the neural network.

In aspect 4, the method of any of aspects 1-3 further includes that the neural network is successfully trained when the UE is able to report back the CSI trained by the neural network, or is able to use trained weights of the neural network to achieve an accuracy or a QoS.

In aspect 5, the method of any of aspects 1-4 further includes that the processing time corresponds to a time between the UE receiving a command to train the neural network and completing the training of the neural network.

In aspect 6, the method of any of aspects 1-5 further includes receiving a configuration from a second network entity at least based on the processing time; and transmitting CSI to the second network entity based on the configuration.

In aspect 7, the method of any of aspects 1-6 further includes that the second network entity is the same as the first network entity.

In aspect 8, the method of any of aspects 1-7 further includes that the second network entity is different than the first network entity.

In aspect 9, the method of any of aspects 1-8 further includes that the UE determines the processing time for training the neural network based on at least one of: a number of layers in the neural network, a number of weights in the neural network, or a type of one or more layers of the neural network.

In aspect 10, the method of any of aspects 1-9 further includes that the processing time for training the neural network is based on information from a previously trained neural network.

In aspect 11, the method of any of aspects 1-10 further includes that the information from the previously trained neural network includes at least one of QCL information or a neural network state indication from the previously trained neural network.

In aspect 12, the method of any of aspects 1-11 further includes that the processing time for training the neural network is based on an amount of neural networks or layers to be trained.

In aspect 13, the method of any of aspects 1-12 further includes that the processing time is based on whether a single neural network or multiple neural networks are to be trained simultaneously.

In aspect 14, the method of any of aspects 1-13 further includes that the multiple neural networks are trained simultaneously based on concurrent training in at least one of: a same component carrier, a same band, a same bandwidth part, a same band combination, a same frequency range, a same slot, a same subframe, or a same frame.

In aspect 15, the method of any of aspects 1-14 further includes that a neural network of the multiple neural networks is trained simultaneously until the UE responds with a complete training message.

In aspect 16, the method of any of aspects 1-15 further includes that the processing time is based on whether a single layer or multiple layers of the neural network are to be trained simultaneously.

In aspect 17, the method of any of aspects 1-16 further includes that the processing time for training the neural network is based on a sequence order of multiple layers of the neural network.

In aspect 18, the method of any of aspects 1-17 further includes that the processing time for training the neural network is based on a type of wireless signal procedure performed by the neural network.

In aspect 19, the method of any of aspects 1-18 further includes that the type of the wireless signal procedure includes at least one of: channel state information determination, demodulation, positioning determination, or waveform determination.

In aspect 20, the method of any of aspects 1-19 further includes that the processing time for training the neural network is based on an accuracy level.

In aspect 21, the method of any of aspects 1-20 further includes that the accuracy level is based on a QoS.

In aspect 22, the method of any of aspects 1-21 further includes that the processing time for reporting the CSF is based on at least one of: an encoder output vector, an encoder input vector, one of more vectors determined at the neural network, a number of layers in the neural network, a first number of elements in an input of the neural network, a second number of elements in an output of the neural network, a third number of elements in an intermediate vector of the neural network, a layer type of one or more layers of the neural network, an amount of neural networks for overlapped reporting, or a sequence order of multiple layers of the neural network.

In aspect 23, the method of any of aspects 1-22 further includes that the UE reports the processing time as a UE capability, a MAC-CE, or UCI.

In aspect 24. the method of any of aspects 1-23 further includes that the UE reports the processing time for at least one of: a bandwidth part, a numerology, a component carrier, a band a band combination, a frequency range, or one or more timeline factor.

In aspect 25, the method of any of aspects 1-24 further includes that the one or more timeline factor includes at least one of: a layer, a layer type, a combination of layers, an input vector length, an output vector length, an intermediate vector length, a number of layers, or a sequence of layers.

In aspect 26, the method of any of aspects 1-25 further includes that the UE reports a first processing time and a second processing time.

In aspect 27, the method of any of aspects 1-26 further includes receiving a configuration from the second network entity to use the first processing time or the second processing time.

In aspect 28, the method of any of aspects 1-27 further includes applying the first processing time or the second processing time based on a power saving feature of the UE.

Aspect 29 is a device including one or more processors and one or more memories in electronic communication with the one or more processors storing instructions executable by the one or more processors to cause the device to implement a method as in any of aspects 1-28.

Aspect 30 is a system or apparatus including means for implementing a method or realizing an apparatus as in any of aspects 1-28.

Aspect 31 is a non-transitory computer readable medium storing instructions executable by one or more processors to cause the one or more processors to implement a method as in any of aspects 1-28.

Aspect 32 is a method of wireless communication at a base station, comprising: receiving a processing time from a UE for at least one of training a neural network for channel state information derivation or reporting the CSI based on a trained neural network; transmitting a configuration to the UE based on the processing time; and receiving the CSI from the UE based on the configuration.

In aspect 33, the method of aspect 32 further includes that the network entity is a base station, a TRP, or another UE.

In aspect 34, the method of aspect 32 or aspect 33 further includes that the processing time corresponds to an amount of time between a first time associated with a reference signal used for training in the neural network and a second time at which the UE has successfully trained the neural network.

In aspect 35, the method of any of aspects 32-34 further includes that the neural network is successfully trained when the UE is able to report back the CSI trained by the neural network, or is able to use trained weights of the neural network to achieve an accuracy or a QoS.

In aspect 36, the method of any of aspects 32-35 further includes that the processing time corresponds to a time between the UE receiving a command to train the neural network and completing the training of the neural network.

In aspect 37, the method of any of aspects 32-36 further includes that the processing time for training the neural network is based on at least one of: a number of layers in the neural network, a number of weights in the neural network, or a type of one or more layers of the neural network.

In aspect 38, the method of any of aspects 32-37 further includes that the processing time for training the neural network is based on use of information from a previously trained neural network.

In aspect 39, the method of any of aspects 32-38 further includes that the information from the previously trained neural network includes at least one of QCL information or a neural network state indication from the previously trained neural network.

In aspect 40, the method of any of aspects 32-39 further includes that the processing time for training the neural network is based on an amount of neural networks or layers to be trained.

In aspect 41, the method of any of aspects 32-40 further includes that the processing time is based on whether a single neural network or multiple neural networks are to be trained simultaneously.

In aspect 42, the method of any of aspects 32-41 further includes that the multiple neural networks are trained simultaneously based on concurrent training in at least one of: a same component carrier, a same band, a same bandwidth part, a same band combination, a same frequency range, a same slot, a same subframe, or a same frame.

In aspect 43, the method of any of aspects 32-42 further includes that a neural network of the multiple neural networks is trained simultaneously until the UE responds with a complete training message.

In aspect 44, the method of any of aspects 32-43 further includes that the processing time is based on whether a single layer or multiple layers of the neural network are to be trained simultaneously.

In aspect 45, the method of any of aspects 32-44 further includes that the processing time for training the neural network is based on a sequence order of multiple layers of the neural network.

In aspect 46, the method of any of aspects 32-45 further includes that the processing time for training the neural network is based on a type of wireless signal procedure performed by the neural network.

In aspect 47, the method of any of aspects 32-46 further includes that the type of the wireless signal procedure includes at least one of: channel state information determination, demodulation, positioning determination, or waveform determination.

In aspect 48, the method of any of aspects 32-47 further includes that the processing time for training the neural network is based on an accuracy level.

In aspect 49, the method of any of aspects 32-48 further includes that the accuracy level is based on a QoS.

In aspect 50, the method of any of aspects 32-49 further includes that the processing time for reporting the CSF is based on at least one of: an encoder output vector, an encoder input vector, one of more vectors determined at the neural network, a number of layers in the neural network, a first number of elements in an input of the neural network, a second number of elements in an output of the neural network, a third number of elements in an intermediate vector of the neural network, a layer type of one or more layers of the neural network, an amount of neural networks for overlapped reporting, or a sequence order of multiple layers of the neural network.

In aspect 51, the method of any of aspects 32-50 further includes that the processing time is received as a UE capability, a MAC-CE, or UCI.

In aspect 52, the method of any of aspects 32-51 further includes that the processing time is received for at least one of: a bandwidth part, a numerology, a component carrier, a band a band combination, a frequency range, or one or more timeline factor.

In aspect 53, the method of any of aspects 32-52 further includes that the one or more timeline factor includes at least one of: a layer, a layer type, a combination of layers, an input vector length, an output vector length, an intermediate vector length, a number of layers, or a sequence of layers.

In aspect 54, the method of any of aspects 32-53 further includes that the base station receives a first processing time and a second processing time from the UE.

In aspect 55, the method of any of aspects 32-54 further includes configuring the UE to use the first processing time or the second processing time.

Aspect 56 is a device including one or more processors and one or more memories in electronic communication with the one or more processors storing instructions executable by the one or more processors to cause the device to implement a method as in any of aspects 32-55.

Aspect 57 is a system or apparatus including means for implementing a method or realizing an apparatus as in any of aspects 32-55.

Aspect 58 is a non-transitory computer readable medium storing instructions executable by one or more processors to cause the one or more processors to implement a method as in any of aspects 32-55.

Aspect 59 is an apparatus for wireless communication comprising memory and at least one processor configured to perform the method of any of aspects 32-55.

In aspect 60, the apparatus of aspect 59 further includes at least one antenna and a transceiver coupled to the at least one antenna and the at least one processor.

Aspect 61 is an apparatus for wireless communication comprising memory and at least one processor configured to perform the method of any of aspects 1-28.

In aspect 62, the apparatus of aspect 61 further includes at least one antenna and a transceiver coupled to the at least one antenna and the at least one processor.

What is claimed is:

1. An apparatus for wireless communication at a user equipment (UE), comprising:
- memory; and
- at least one processor coupled to the memory and configured to:
  - determine, at the UE, a processing time to train a machine learning (ML) or neural network (NN) model at the UE for channel state information (CSI) derivation; and
  - transmit a message that includes an indication of the determined processing time to a first network entity, wherein the at least one processor is further configured to:
  - report a first processing time and a second processing time;
  - receive a configuration to use the first processing time or the second processing time; and
  - apply the first processing time or the second processing time based on a power saving feature of the UE.

2. The apparatus of claim 1, wherein the first network entity is a base station, a transmission reception point (TRP), or another UE and the apparatus further includes:
- at least one antenna; and
- a transceiver coupled to the at least one antenna and the at least one processor.

3. The apparatus of claim 1, wherein the processing time corresponds to an amount of time between a first time associated with a reference signal used for training in the ML or NN model and a second time at which the UE has successfully trained the ML or NN model.

4. The apparatus of claim 3, wherein the ML or NN model is successfully trained when the UE is able to report back the CSI trained by the ML or NN model, or is able to use trained weights of the ML or NN model to achieve an accuracy or a quality of service (QoS).

5. The apparatus of claim 1, wherein the processing time corresponds to a time between reception of a command to train the ML or NN model and completion of the training of the ML or NN model.

6. The apparatus of claim 1, wherein the at least one processor is further configured to:
- receive a configuration from a second network entity at least based on the processing time; and
- transmit channel state information (CSI) to the second network entity based on the configuration.

7. The apparatus of claim 1, wherein the processing time for training the ML or NN model is based on at least one of:
- a number of layers in the ML or NN model,
- a number of weights in the ML or NN model, or
- a type of one or more layers of the ML or NN model.

8. The apparatus of claim 1, wherein the processing time for training the ML or NN model is based on at least one of quasi co-location (QCL) information or a model state indication from a previously trained model.

9. The apparatus of claim 1, wherein the processing time for training the ML or NN model is based on an amount of models or layers to be trained.

10. The apparatus of claim 9, wherein the processing time is further based on whether a single ML or NN model or multiple models are to be trained simultaneously.

11. The apparatus of claim 10, wherein the processing time is based on training the multiple models are trained simultaneously based on concurrent training in at least one of:
- a same component carrier,
- a same band,
- a same bandwidth part, a same band combination,
a same frequency range,
a same slot,
a same subframe, or
a same frame,
wherein the multiple models are trained simultaneously until the UE responds with a complete training message.

12. The apparatus of claim 10, wherein the processing time is further based on whether a single layer or multiple layers of the ML or NN model are to be trained simultaneously.

13. The apparatus of claim 1, wherein the processing time for training the ML or NN model is based on a sequence order of multiple layers of the ML or NN model.

14. The apparatus of claim 1, wherein the processing time for training the ML or NN model is based on a type of wireless signal procedure performed by the ML or NN model, the type of the wireless signal procedure including at least one of:
channel state information determination,
demodulation,
positioning determination, or
waveform determination.

15. The apparatus of claim 1, wherein the processing time for training the ML or NN model is based on an accuracy level.

16. The apparatus of claim 1, wherein the message further indicates another processing time for reporting the CSI that is based on at least one of:
an encoder output vector,
an encoder input vector,
one of more vectors determined at the ML or NN model,
a number of layers in the ML or NN model,
a first number of elements in an input of the ML or NN model,
a second number of elements in an output of the ML or NN model,
a third number of elements in an intermediate vector of the ML or NN model,
a layer type of one or more layers of the ML or NN model,
an amount of models for overlapped reporting, or
a sequence order of multiple layers of the ML or NN model.

17. The apparatus of claim 1, wherein the processing time is for at least one of:
a bandwidth part,
a numerology,
a component carrier,
a band,
a band combination,
a frequency range, or
one or more timeline factor, and
wherein the one or more timeline factor includes at least one of:
a layer,
a layer type,
a combination of layers,
an input vector length,
an output vector length,
an intermediate vector length,
a number of layers, or
a sequence of layers.

18. A method of wireless communication at a user equipment (UE), comprising:
determining, at the UE, a processing time to train a machine learning (ML) or neural network (NN) model at the UE for channel state information (CSI) derivation; and
transmitting a message indicating the determined processing time to a first network entity,
wherein the method further comprises:
reporting a first processing time and a second processing time;
receiving a configuration to use the first processing time or the second processing time; and
applying the first processing time or the second processing time based on a power saving feature of the UE.

19. An apparatus for wireless communication, comprising:
memory; and
at least one processor coupled to the memory and configured to:
receive a message that includes an indication of a processing time from a user equipment (UE), wherein the indication indicates the processing time to train a machine learning (ML) or neural network (NN) model at the UE for channel state information (CSI) derivation;
transmit a configuration to the UE based on the processing time; and
receive the CSI from the UE after transmission of the configuration,
wherein the at least one processor is further configured to:
receive a first processing time and a second processing time from the UE; and
configure the UE to use the first processing time or the second processing time.

20. The apparatus of claim 19, wherein the wireless communication is at a base station, a transmission reception point (TRP), or another UE, the apparatus further comprising:
at least one antenna; and
a transceiver coupled to the at least one antenna and the at least one processor.

21. The apparatus of claim 19, wherein the processing time corresponds to an amount of time between a first time associated with a reference signal used for training in the ML or NN model and a second time at which the UE has successfully trained the ML or NN model, and wherein the ML or NN model is successfully trained when the UE is able to report back the CSI trained by the ML or NN model, or is able to use trained weights of the ML or NN model to achieve an accuracy or a quality of service (QoS).

22. The apparatus of claim 19, wherein the processing time corresponds to a time between reception of a command to train the ML or NN model and completion of the training of the ML or NN model.

23. The apparatus of claim 19, wherein the processing time for training the ML or NN model is based on at least one of:
a number of layers in the ML or NN model,
a number of weights in the ML or NN model,
a type of one or more layers of the ML or NN model, quasi co-location (QCL) information from a previously trained ML or NN model, or
a ML or NN model state indication from the previously trained ML or NN model.

24. The apparatus of claim 19, wherein the processing time for training the ML or NN model is based on at least one of an amount of models or layers to be trained and whether a single ML or NN model or multiple models are to be trained simultaneously, wherein the multiple models s are trained simultaneously based on concurrent training in at least one of:

a same component carrier,
a same band,
a same bandwidth part,
a same band combination,
a same frequency range,
a same slot,
a same subframe, or
a same frame.

25. The apparatus of claim 19, wherein the processing time is based on at least one of whether a single layer or multiple layers of the ML or NN model are to be trained simultaneously, a sequence order of the multiple layers of the ML or NN model, a type of wireless signal procedure performed by the ML or NN model, or an accuracy level.

26. The apparatus of claim 19, wherein the message further indicates another processing time for reporting the CSI that is based on at least one of:

an encoder output vector,
an encoder input vector,
one of more vectors determined at the ML or NN model,
a number of layers in the ML or NN model,
a first number of elements in an input of the ML or NN model,
a second number of elements in an output of the ML or NN model,
a third number of elements in an intermediate vector of the ML or NN model,
a layer type of one or more layers of the ML or NN model,
an amount of models for overlapped reporting, or
a sequence order of multiple layers of the ML or NN model.

27. The apparatus of claim 19, wherein the processing time for at least one of:

a bandwidth part,
a numerology,
a component carrier,
a band,
a band combination,
a frequency range, or
one or more timeline factor, and, wherein the one or more timeline factor includes at least one of:
a layer,
a layer type,
a combination of layers,
an input vector length,
an output vector length,
an intermediate vector length,
a number of layers, or
a sequence of layers.

28. A method of wireless communication, comprising:

receiving a message that includes an indication of a processing time from a user equipment (UE), wherein the indication indicates the processing time to train a machine learning (ML) or neural network (NN) model at the UE for channel state information (CSI) derivation;

transmitting a configuration to the UE based on the processing time; and receiving the CSI from the UE after transmission of the configuration, wherein the method further comprises:

receiving a first processing time and a second processing time from the UE; and configuring the UE to use the first processing time or the second processing time.

* * * * *